US012280403B2

(12) United States Patent
Kumar et al.

(10) Patent No.: US 12,280,403 B2
(45) Date of Patent: Apr. 22, 2025

(54) SORTING BASED ON CHEMICAL COMPOSITION

(71) Applicant: Sortera Technologies, Inc., Markle, IN (US)

(72) Inventors: Nalin Kumar, Fort Wayne, IN (US); Manuel Gerardo Garcia, Jr., Austin, TX (US)

(73) Assignee: SORTERA TECHNOLOGIES, INC., Markle, IN (US)

( * ) Notice: Subject to any disclaimer, the term of this patent is extended or adjusted under 35 U.S.C. 154(b) by 0 days.

(21) Appl. No.: 18/751,179

(22) Filed: Jun. 21, 2024

(65) Prior Publication Data

US 2024/0342757 A1 Oct. 17, 2024

Related U.S. Application Data

(60) Continuation of application No. 17/696,831, filed on Mar. 16, 2022, now Pat. No. 12,017,255, which is a continuation-in-part of application No. 17/667,397, filed on Feb. 8, 2022, now Pat. No. 11,969,764, which is a continuation-in-part of application No. 17/495,291, filed on Oct. 6, 2021, now Pat. No. 11,975,365, which is a continuation-in-part of application No. 17/491,415, filed on Sep. 30, 2021, now Pat. No. 11,278,937, and a continuation of application No. 17/380,928, filed on Jul. 20, 2021, (Continued)

(51) Int. Cl.

| | |
|---|---|
| ***B07C 5/34*** | (2006.01) |
| ***B07C 5/342*** | (2006.01) |
| *B07C 5/04* | (2006.01) |

(52) U.S. Cl.

CPC .............. *B07C 5/3422* (2013.01); *B07C 5/34* (2013.01); *B07C 5/342* (2013.01); *B07C 5/04* (2013.01); *B07C 2501/0054* (2013.01)

(58) Field of Classification Search

CPC .. B07C 5/04; B07C 5/34; B07C 5/342; B07C 5/3422; B07C 2501/0054

USPC .......................................................... 209/577

See application file for complete search history.

(56) References Cited

U.S. PATENT DOCUMENTS 2,194,381 A 9/1937 Cadman
2,417,878 A 2/1944 Luzietti et al.

(Continued)

FOREIGN PATENT DOCUMENTS

BR PI0210794-5 B1 7/2002
CA 2893877 12/2015

(Continued)

OTHER PUBLICATIONS

"Alloy Data: Aluminum Die Casting Alloys," MES, Inc., 4 pages, downloaded from the internet Mar. 28, 2019, www.mesinc.com.

(Continued)

*Primary Examiner* — Terrell H Matthews
(74) *Attorney, Agent, or Firm* — Kelly Kordzik

(57) ABSTRACT

Systems and methods for classifying and sorting materials in order to produce a collection of materials that are composed of a particular chemical composition in the aggregate. The system may utilize a vision system and one or more sensor systems, which may implement a machine learning system in order to identify or classify each of the materials. The sorting is then performed as a function of the classifications.

18 Claims, 10 Drawing Sheets

Related U.S. Application Data which is a continuation-in-part of application No. 17/227,245, filed on Apr. 9, 2021, now Pat. No. 11,964,304, which is a continuation-in-part of application No. 16/939,011, filed on Jul. 26, 2020, now Pat. No. 11,471,916, said application No. 17/491,415 is a continuation-in-part of application No. 16/852,514, filed on Apr. 19, 2020, now Pat. No. 11,260,426, said application No. 16/939,011 is a continuation of application No. 16/375,675, filed on Apr. 4, 2019, now Pat. No. 10,722,922, said application No. 16/852,514 is a division of application No. 16/358,374, filed on Mar. 19, 2019, now Pat. No. 10,625,304, said application No. 16/375,675 is a continuation-in-part of application No. 15/963,755, filed on Apr. 26, 2018, now Pat. No. 10,710,119, said application No. 16/358,374 is a continuation-in-part of application No. 15/963,755, filed on Apr. 26, 2018, now Pat. No. 10,710,119, which is a continuation-in-part of application No. 15/213,129, filed on Jul. 18, 2016, now Pat. No. 10,207,296.

(60) Provisional application No. 63/249,069, filed on Sep. 28, 2021, provisional application No. 63/258,964, filed on Jun. 10, 2021, provisional application No. 63/173,301, filed on Apr. 9, 2021, provisional application No. 63/146,892, filed on Feb. 8, 2021, provisional application No. 62/490,219, filed on Apr. 26, 2017, provisional application No. 62/193,332, filed on Jul. 16, 2015.

(56) References Cited

U.S. PATENT DOCUMENTS 2,942,792 A 7/1957 Anderson et al.
2,953,554 A 9/1960 Miller et al.
3,233,973 A * 2/1966 Veo .......................... C04B 7/38 422/62
3,512,638 A 5/1970 Chengges et al.
3,662,874 A 5/1972 Muller
3,791,518 A 2/1974 Vanderhoof
3,955,678 A 5/1976 Moyer
3,973,736 A 8/1976 Nilsson
3,974,909 A 8/1976 Johnson
4,004,681 A 1/1977 Clewett et al.
4,031,998 A 6/1977 Suzuki et al.
4,044,897 A 8/1977 Maxted
4,253,154 A 2/1981 Russ et al.
4,317,521 A 3/1982 Clark et al.
4,413,721 A 11/1983 Bollier
4,488,610 A 12/1984 Yankloski
4,572,735 A 2/1986 Poetzschke et al.
4,586,613 A 5/1986 Horii
4,726,464 A 2/1988 Canziani
4,834,870 A 5/1989 Osterberg et al.
4,848,590 A 7/1989 Kelly
5,016,039 A 5/1991 Sosa
5,042,947 A 8/1991 Potzschke
5,054,601 A 10/1991 Sjogren et al.
5,114,230 A 5/1992 Pryor
5,236,092 A 8/1993 Krotkov et al.
5,260,576 A 11/1993 Sommer, Jr. et al.
5,410,637 A 4/1995 Kern et al.
5,433,311 A 7/1995 Bonnet
5,462,172 A 10/1995 Kumagai et al.
5,570,773 A 11/1996 Bonnet
5,663,997 A 9/1997 Willis et al.
5,676,256 A 10/1997 Kumar et al.
5,733,592 A 3/1998 Wettstein et al.
5,738,224 A 4/1998 Sommer, Jr. et al.
5,813,543 A * 9/1998 Gesing ..................... B07C 5/34 700/223
5,836,436 A 11/1998 Fortenbery et al.
5,911,327 A 6/1999 Tanaka et al.
6,012,659 A 1/2000 Nakazawa et al.
6,064,476 A 5/2000 Goltsos
6,076,653 A 6/2000 Bonnet
6,100,487 A 8/2000 Schultz et al.
6,124,560 A 9/2000 Roos
6,148,990 A 11/2000 Lapeyre et al.
6,266,390 B1 7/2001 Sommer, Jr. et al.
6,273,268 B1 8/2001 Axmann
6,313,422 B1 11/2001 Anibas
6,313,423 B1 11/2001 Sommer
6,412,642 B2 7/2002 Charles et al.
6,457,859 B1 10/2002 Lu et al.
6,519,315 B2 2/2003 Sommer, Jr. et al.
6,545,240 B2 4/2003 Kumar
6,795,179 B2 9/2004 Kumar
6,888,917 B2 5/2005 Sommer, Jr. et al.
6,983,035 B2 1/2006 Price et al.
7,073,651 B2 7/2006 Costanzo et al.
7,099,433 B2 8/2006 Sommer et al.
7,200,200 B2 4/2007 Laurila et al.
7,341,154 B2 3/2008 Boer
7,564,943 B2 7/2009 Sommer, Jr. et al.
7,616,733 B2 11/2009 Sommer et al.
7,674,994 B1 3/2010 Valerio
7,763,820 B1 7/2010 Sommer, Jr. et al.
7,802,685 B2 9/2010 Allen, III et al.
7,848,484 B2 12/2010 Sommer, Jr. et al.
7,886,915 B2 2/2011 Shulman
7,903,789 B2 3/2011 Morton et al.
7,978,814 B2 7/2011 Sommer et al.
7,991,109 B2 8/2011 Golenhofen
8,073,099 B2 12/2011 Niu et al.
8,144,831 B2 3/2012 Sommer, Jr. et al.
8,172,069 B2 5/2012 Prakasam
8,429,103 B1 4/2013 Aradhye et al.
8,433,121 B2 4/2013 Kosarev
8,476,545 B2 7/2013 Sommer et al.
8,553,838 B2 10/2013 Sommer et al.
8,567,587 B2 10/2013 Faist et al.
8,576,988 B2 11/2013 Lewalter et al.
8,600,545 B2 12/2013 Earlam
8,615,123 B2 12/2013 Dabic
8,654,919 B2 2/2014 Sabol et al.
8,855,809 B2 10/2014 Spencer et al.
8,903,040 B2 12/2014 Maeyama et al.
9,156,162 B2 10/2015 Suzuki et al.
9,316,596 B2 4/2016 Levesque
9,424,635 B2 8/2016 Killmann
9,514,590 B2 12/2016 Lindbichler
9,785,851 B1 10/2017 Torek et al.
9,927,354 B1 3/2018 Starr
9,956,609 B1 5/2018 De Saro
10,088,425 B2 5/2018 Buckley
10,005,107 B2 6/2018 Ogusu
10,036,142 B2 7/2018 Bamber
10,207,296 B2 2/2019 Garcia et al.
10,295,451 B2 5/2019 Schneider
10,467,477 B2 11/2019 Gershtein
10,478,861 B2 11/2019 Comtois
10,486,209 B2 11/2019 Wimmer
10,710,119 B2 7/2020 Kumar et al.
10,722,922 B2 7/2020 Kumar et al.
10,799,915 B2 * 10/2020 Horowitz ................ B07C 5/367
10,824,936 B2 11/2020 Wu
10,967,404 B2 4/2021 Grof
11,278,937 B2 3/2022 Sortera
11,702,322 B2 * 7/2023 Sato ........................ B07C 5/368 294/64.3
2002/0186882 A1 12/2002 Cotman
2003/0038064 A1 2/2003 Harbeck et al.
2003/0147494 A1 8/2003 Sommer, Jr. et al.
2004/0151364 A1 8/2004 Kenneway et al.
2004/0235970 A1 11/2004 Smith
2006/0239401 A1 10/2006 Sommer, Jr. et al.
2007/0029232 A1 2/2007 Cowling
2007/0262000 A1 11/2007 Valerio

(56) References Cited

U.S. PATENT DOCUMENTS

| | | | |
|---|---|---|---|
| 2008/0006562 | A1* | 1/2008 | Gnedenko ............... B29B 17/02 209/558 |
| 2008/0029445 | A1 | 2/2008 | Russcher et al. |
| 2008/0041501 | A1 | 2/2008 | Platek et al. |
| 2008/0092922 | A1 | 4/2008 | Dick |
| 2008/0257795 | A1 | 10/2008 | Shuttleworth |
| 2008/0302707 | A1 | 12/2008 | Bourely |
| 2009/0292422 | A1 | 11/2009 | Eiswerth et al. |
| 2010/0017020 | A1 | 1/2010 | Hubbard-Nelson et al. |
| 2010/0195795 | A1 | 8/2010 | Golenhofen |
| 2010/0264070 | A1 | 10/2010 | Sommer, Jr. et al. |
| 2010/0282646 | A1 | 11/2010 | Looy et al. |
| 2011/0017644 | A1 | 1/2011 | Valerio |
| 2011/0083871 | A1 | 4/2011 | Lalancette et al. |
| 2011/0247730 | A1 | 10/2011 | Yanar |
| 2012/0148018 | A1 | 6/2012 | Sommer, Jr. et al. |
| 2012/0288058 | A1 | 11/2012 | Maeyama et al. |
| 2013/0028487 | A1 | 1/2013 | Stager et al. |
| 2013/0079918 | A1 | 3/2013 | Spencer et al. |
| 2013/0092609 | A1 | 4/2013 | Andersen |
| 2013/0126399 | A1 | 5/2013 | Wolff et al. |
| 2013/0184853 | A1 | 7/2013 | Roos |
| 2013/0229510 | A1 | 9/2013 | Killmann |
| 2013/0264249 | A1 | 10/2013 | Sommer, Jr. et al. |
| 2013/0304254 | A1 | 11/2013 | Torek et al. |
| 2015/0012226 | A1 | 1/2015 | Skaff |
| 2015/0050548 | A1 | 2/2015 | Meissner |
| 2015/0092922 | A1 | 4/2015 | Liu et al. |
| 2015/0144537 | A1* | 5/2015 | Skaff ......................... B07C 5/34 702/181 |
| 2015/0170024 | A1 | 6/2015 | Chatterjee et al. |
| 2015/0336135 | A1 | 11/2015 | Corak |
| 2016/0016201 | A1 | 1/2016 | Schons |
| 2016/0022892 | A1 | 1/2016 | Eifler et al. |
| 2016/0059450 | A1 | 3/2016 | Meredith |
| 2016/0066860 | A1 | 3/2016 | Sternickel et al. |
| 2016/0180626 | A1 | 6/2016 | Young |
| 2016/0250665 | A1 | 9/2016 | Lampe |
| 2016/0299091 | A1 | 10/2016 | Bamber et al. |
| 2016/0346811 | A1 | 12/2016 | Iino |
| 2017/0014868 | A1 | 1/2017 | Kumar et al. |
| 2017/0221246 | A1 | 8/2017 | Zhong et al. |
| 2017/0232479 | A1 | 8/2017 | Pietzka et al. |
| 2017/0261437 | A1 | 9/2017 | Buchter et al. |
| 2018/0065155 | A1 | 3/2018 | Ripley |
| 2018/0243800 | A1 | 8/2018 | Kumar et al. |
| 2019/0091729 | A1 | 3/2019 | Gillner |
| 2019/0130560 | A1 | 5/2019 | Horowitz |
| 2019/0210067 | A1 | 7/2019 | Sortera |
| 2019/0247891 | A1 | 8/2019 | Kumar et al. |
| 2019/0299255 | A1 | 10/2019 | Chaganti |
| 2020/0034661 | A1 | 1/2020 | Kim |
| 2020/0050922 | A1 | 2/2020 | Wu et al. |
| 2020/0084966 | A1 | 3/2020 | Corban et al. |
| 2020/0290088 | A1 | 9/2020 | Kumar et al. |
| 2020/0361659 | A1 | 11/2020 | Whitman et al. |
| 2020/0368786 | A1 | 11/2020 | Kumar et al. |
| 2021/0001377 | A1 | 1/2021 | Sutton |
| 2021/0094075 | A1 | 4/2021 | Horowitz et al. |
| 2021/0217156 | A1 | 7/2021 | Balachandran et al. |
| 2021/0229133 | A1 | 7/2021 | Kumar et al. |
| 2021/0346916 | A1 | 11/2021 | Kumar et al. |
| 2022/0016675 | A1 | 1/2022 | Kumar et al. |
| 2022/0023918 | A1 | 1/2022 | Kumar et al. |
| 2022/0161298 | A1 | 5/2022 | Kumar et al. |
| 2022/0168781 | A1 | 6/2022 | Kumar et al. |
| 2022/0203407 | A1 | 6/2022 | Kumar et al. |
| 2022/0245402 | A1 | 8/2022 | Tae |
| 2022/0355342 | A1 | 11/2022 | Kumar et al. |
| 2022/0371057 | A1 | 11/2022 | Kumar et al. |
| 2023/0011383 | A1 | 1/2023 | Balthasar |
| 2023/0044783 | A1 | 2/2023 | Garcia, Jr. et al. |
| 2023/0053268 | A1 | 2/2023 | Garcia, Jr. et al. |
| 2023/0169751 | A1 | 6/2023 | Geurts |
| 2023/0173543 | A1 | 6/2023 | Kumar et al. |
| 2023/0176028 | A1 | 6/2023 | Kumar et al. |
| 2024/0109103 | A1 | 4/2024 | Kumar et al. |
| 2024/0116084 | A1 | 4/2024 | Gagliardi |
| 2024/0149304 | A1 | 5/2024 | Kumar et al. |
| 2024/0228180 | A9 | 7/2024 | Chellappan et al. |
| 2024/0228181 | A9 | 7/2024 | Chellappan et al. |

FOREIGN PATENT DOCUMENTS

| | | | |
|---|---|---|---|
| CN | 1283319 | | 2/2001 |
| CN | 200953004 | | 9/2007 |
| CN | 201440132 | | 4/2010 |
| CN | 201464390 | | 5/2010 |
| CN | 101776620 | A | 7/2010 |
| CN | 201552461 | | 7/2010 |
| CN | 102861722 | | 1/2013 |
| CN | 103501925 | | 1/2014 |
| CN | 103745901 | | 4/2014 |
| CN | 101776620 | B | 6/2014 |
| CN | 103955707 | | 7/2014 |
| CN | 203688493 | | 7/2014 |
| CN | 204359695 | | 5/2015 |
| CN | 204470139 | | 7/2015 |
| CN | 204495749 | | 7/2015 |
| CN | 204537711 | | 8/2015 |
| CN | 204575572 | | 8/2015 |
| CN | 104969266 | | 10/2015 |
| CN | 106000904 | | 10/2016 |
| CN | 107403198 | | 11/2017 |
| CN | 107552412 | | 1/2018 |
| CN | 107790398 | | 3/2018 |
| CN | 111659635 | | 9/2020 |
| CN | 21188005 | U | 11/2020 |
| CN | 113272649 | | 8/2021 |
| DE | 202009006383 | | 9/2009 |
| EP | 0011892 | | 11/1983 |
| EP | 0074447 | | 1/1987 |
| EP | 0433828 | A2 | 12/1990 |
| EP | 0351778 | B1 | 10/1993 |
| EP | 2243089 | A1 | 10/2010 |
| EP | 3263234 | | 1/2018 |
| JP | H07-275802 | | 10/1995 |
| JP | 2010-172799 | | 8/2010 |
| JP | 5083196 | | 11/2012 |
| JP | 2015-512075 | | 4/2015 |
| JP | 5969685 | | 7/2016 |
| JP | 2017-109197 | | 6/2017 |
| JP | 202163078 | | 10/2021 |
| KR | 20090106056 | | 10/2009 |
| RU | 2004101401 | | 2/2005 |
| RU | 2006136756 | | 4/2008 |
| RU | 2339974 | | 11/2008 |
| RU | 2361194 | | 7/2009 |
| TW | 200940989 | | 10/2009 |
| TW | I707812 | | 10/2020 |
| WO | WO9920048 | | 4/1999 |
| WO | WO2001/022072 | | 3/2001 |
| WO | WO2009/039284 | | 3/2009 |
| WO | WO2011/159269 | | 12/2011 |
| WO | WO2012/094568 | A2 | 7/2012 |
| WO | WO2013/033572 | | 3/2013 |
| WO | WO2013/180922 | | 12/2013 |
| WO | WO2015/195988 | | 12/2015 |
| WO | WO2016/199074 | | 12/2016 |
| WO | WO2017/001438 | | 1/2017 |
| WO | WO2017/011835 | | 1/2017 |
| WO | WO2017221246 | | 12/2017 |
| WO | WO2018/091617 | | 5/2018 |
| WO | WO2021/089602 | | 5/2021 |
| WO | WO2021/126876 | | 6/2021 |
| WO | WO2019/180438 | | 9/2022 |
| WO | WO2023/137423 | | 7/2023 |

OTHER PUBLICATIONS

A. Lee, "Comparing Deep Neural Networks and Traditional Vision Algorithms in Mobile Robotics," Swarthmore College, 9 pages, downloaded from Internet on May 1, 2018.

(56) References Cited

OTHER PUBLICATIONS

Aclima; How artificial intelligence helps recycling become more circular; retrieved frfom https://aclima.eus/how-artificial-intelligence-helps-recycling-become-more-circular; Jan. 27, 2022; [5 pages]; VE.
Acplasics, Inc.; 7 Different Types of Plastic; https://www.acplasticsinc.com/informationcenter/r/7-different-types-of-plastic-and-how-they-are-used; 4 pages; Jan. 27, 2022; A&C Plastics; Houston, TX.
Aimplas; Classification and identification of plastics; https://www.aimplas.net/blog/plastics-identification-and-classification/; Jan. 27, 2022; 4 pages; València Parc Tecnològic; Valencia; SPAIN.
B. Shaw, "Applicability of total reflection X-ray fluorescence (TXRF) as a screening platform for pharmaceutical inorganic impurity analysis," Journal of Pharmaceutical and Biomedical Analysis, vol. 63, 2012, pp. 151-159.
Bishop, Christopher M.; Neural Networks for Pattern Recognition; 494 pages; Clarendon Press; 1995; Oxford, UK.
Briefing Elemental Impurities-Limits, Revision Bulletin, The United States Pharmacopeial Convention, Feb. 1, 2013, 3 pages.
C. K. Lowe et al., "Data Mining With Different Types of X-Ray Data," JCPDS-International Centre for Diffraction Data 2006, ISSN 1097-0002, pp. 315-321.
C.O. Augustin et al., "Removal of Magnesium from Aluminum Scrap and Aluminum-Magnesium Alloys," Bulletin of Electrochemistry 2(6), Nov.-Dec. 1986; pp. 619-620.
Chapter 6, Functional Description, S2 Picofox User Manual, 2008, pp. 45-64.
Chinese Patent Office; Office Action issued for corresponding Chinese Application No. 201980043725.X on Apr. 28, 2022; 21 pages; Beijing, CN.
D. Bradley, "Pharmaceutical toxicity: AAS and other techniques measure pharma heavy metal," Ezine, May 15, 2011, 2 pages.
E. Margui et al., "Determination of metal residues in active pharmaceutical ingredients according to European current legislation by using X-ray fluorescence spectrometry," J. Anal. At. Spectrom., Jun. 16, 2009, vol. 24, pp. 1253-1257.
E.A. Vieira et al., "Use of Chlorine to Remove Magnesium from Molten Aluminum," Materials Transactions, vol. 53, No. 3, pp. 477-482, Feb. 25, 2012.
Elemental Impurity Analysis In Regulated Pharmaceutical Laboratories, A Primer, Agilent Technologies, Jul. 3, 2012, 43 pages.
Energy Information Administration; Methodoly for Allocating Municipal solid Waste to Biogenic and Non-Biogenic Energy; May 2007; 18 pages; US.
European Patent Office; Extended European Search Report for corresponding EP 19792330.3; Apr. 30, 2021; 7 pages; Munich, DE.
European Patent Office; Extended Search Report for 16825313.6; Jan. 28, 2019; 12 pages; Munich, DE.
Exova, X-ray fluorescence: a new dimension to elemental analysis, downloaded from www.exova.com on Jul. 26, 2016, 3 pages.
Fadillah et al.; Recent Progress in Low-Cost Catalysts for Pyrolysis of Plastic Waste to Fuels; 17 pages; Catalysts 2021, 11, 837; Jul. 10, 2021; mdpi.com; Basel, Switzerland.
G. O'Neil, "Direct Identification and Analysis of Heavy Metals in Solution (Hg, Cu, Pb, Zn, Ni) by Use of in Situ Electrochemical X-ray Fluorescence," Analytical Chemistry, Feb. 2015, 22 pages.
Gao; Applying Improved Optical Recognition with Machine Learning on Sorting Cu Impurities in Steel Scrap; 1-12, Journal of Sustainable Metallurgy, Web, Dec. 7, 2020.
Guideline for Elemental Impurities, Q3D, International Conference on Harmonisation of Technical Requirements For Registration of Pharmaceuticals for Human Use, ICH Harmonised Guideline, Current Step 4 version, Dec. 16, 2014, 77 pages.
Guillory et al; Analysis of Multi-layer polymer films; Apr. 2009; vol. 12; No. 4, Materials Today; 2 pages; Elseview; NL.
H. Rebiere et al., "Contribution of X-Ray Fluorescence Spectrometry For The Analysis Of Falsified Products," ANSM, The French National Agency for Medicines and Health Products Safety, Laboratory Controls Division, France, 1 page, (date unknown).
India Patent Office; Office Action issued for corresponding India Application Serial No. 201937044046; Jun. 4, 2020; 7 pages; IN.
India Patent Office; Office Action issued for corresponding India Application Serial No. 201817002365; Mar. 12, 2020; 6 pages; IN.
International Alloy Designations and Chemical Composition Limits for Wrought Aluminum and Wrought Aluminum Alloys, The Aluminum Association, Inc., revised Jan. 2015, 38 pages.
International Searching Authority, International Search Report and the Written Opinion, International Application No. PCT/US2016/042850, Sep. 28, 2016.
International Searching Authority, International Search Report and the Written Opinion, International Application No. PCT/US2018/029640, Jul. 23, 2018; 23 pages; Alexandria, VA; US.
International Searching Authority, International Search Report and the Written Opinion, International Application No. PCT/US2019/022995, Jun. 5, 2019; 10 pages; Alexandria, VA; US.
International Searching Authority, International Search Report and The Written Opinion of the International Searching Authority, International Application No. PCT/US2016/45349, Oct. 17, 2016.
J. McComb et al., "Rapid screening of heavy metals and trace elements in environmental samples using portable X-ray fluorescence spectrometer, A comparative study," Water Air Soil Pollut., Dec. 2014, vol. 225, No. 12, pp. 1-16.
J. Mondia, "Using X-ray fluorescence to measure inorganics in biopharmaceutical raw materials," Anal. Methods, Mar. 18, 2015, vol. 7, pp. 3545-3550.
J. Schmidhuber et al., "Deep Learning in Neural Networks: An Overview," The Swiss AI Lab IDSIA, Technical Report IDSIA-03-14/arXiv:1404.7828 v4 [cs.NE], Oct. 8, 2014, 88 pages.
Japan Patent Office; Office Action issued Jan. 10, 2023 for Serial No. 2021-509947; 9 pages [with translation].
Jones et al., "Safe Steering Wheel Airbag Removal Using Active Disassemly":, DS 30; Proceedings of DESIGN 2002, the 7th International Design Converence, dubrovnik, Retrieved on Jul. 10, 2022, from <https://desigsociety.org/publiatio/29632/Safe+Steering+Wheel+Airbag+Removal+Using+Active+Dissembly>.
K. Tarbell et al., "Applying Machine Learning to the Sorting of Recyclable Containers," University of Illinois at Urbana-Champaign, Urbana, Illinois, 7 pages, downloaded from Internet on May 1, 2018.
L. Goncalves, "Assessment of metal elements in final drug products by wavelength dispersive X-ray fluorescence spectrometry," Anal. Methods, May 19, 2011, vol. 3, pp. 1468-1470.
L. Hutton, "Electrochemical X-ray Fluorescence Spectroscopy for Trace Heavy Metal Analysis: Enhancing X-ray Fluorescence Detection Capabilities by Four Orders of Magnitude," Analytical Chemistry, Apr. 4, 2014, vol. 86, pp. 4566-4572.
L. Moens et al., Chapter 4, X-Ray Fluorescence, Modern Analytical Methods in Art and Archaeology, Chemical Analysis Series, vol. 155, pp. 55-79, copyright 2000.
Lukka et al; Robotic Sorting using Machine Learing; ZenRobotics Recycler; Sensor Based Sorting 2014; https://users.ics.aalto.fi > praiko > papers > SBS14; US.
M. Baudelet et al., "The first years of laser-induced breakdown spectroscopy," J. Anal. At. Spectrom., Mar. 27, 2013, 6 pages.
M. Razzak et al., "Deep Learning for Medical Image Processing: Overview, Challenges and Future," 30 pages, downloaded from Internet on May 1, 2018.
M. Singh et al., "Transforming Sensor Data to the Image Domain for Deep Learning—an Application to Footstep Detection," International Joint Conference on Neural Networks, Anchorage, Alaska, 8 pages, May 14-19, 2017.
P. R. Schwoebel et al., "Studies of a prototype linear stationary x-ray source for tomosynthesis imaging," Phys. Med Biol. 59, pp. 2393-2413, Apr. 17, 2014.
R. Sitko et al., "Quantification in X-Ray Fluorescence Spectrometry," X-Ray Spectroscopy, Dr. Shatendra K Sharma (Ed.), ISBN: 978-953-307-967-7, InTech, 2012, pp. 137-163; Available from: http://www.intechopen.com/books/x-ray-spectroscopy/quantification-in-x-ray-fluorescence-spectrometry.

(56) References Cited

OTHER PUBLICATIONS

Rozenstein, O. et al; Development of a new approach based on midwave infrared spectroscopy for post-consumer black plastic waste sorting in the recycling industry; Waste Management 68 (2017; pp. 38-44; abstract.
Ruj et al; Sorting of plastic waste for effective recycling; Int. Journal of Applied Sciences and Engineering Research, vol. 4, Issue 4, 2015; 8 pages; International Journal of Applied Science and Engineering Research; ijaser.com; New Delhi, IN.
Sapp; Lehigh University scores $3.5M DOE Grant to use AI and spectroscopy to analyze waste materials; Biofuelsdigest.com; retrieved from https://www.biofuelsdigest.com/bdigest/2021/09/27/lehigh-university-scores-3-5m-doe-grant-to-use-ai-and-spectroscopy-to-analyse-waste-materials/; 1 page; Sep. 27, 2021; US.
Scrap Specifications Circular, Institute of Scrap Recycling Industries, Inc., effective Jan. 21, 2016, 58 pages.
Skpecim Spectral Imaging; Hyperspectral Technology vs. RGB; at least as early as Mar. 9, 2021; 3 pages; Oulu, Finland.
SPECIM; Plastics Sorting with SPECIM FX Cameras; 5 pages; Dec. 18, 2020; Oulu, FI.
T. Miller et al., "Elemental Imaging For Pharmaceutical Tablet Formulations Analysis By Micro X-Ray Fluorescence," International Centre for Diffraction Data, 2005, Advances in X-ray Analysis, vol. 48, pp. 274-283.
T. Moriyama, "Pharmaceutical Analysis (5), Analysis of trace impurities in pharmaceutical products using polarized EDXRF spectrometer NEX CG," Rigaku Journal, vol. 29, No. 2, 2013, pp. 19-21.
Taiwan Patent Office; Allowance of corresponding Application No. 111112261; 3 pages; Oct. 4, 2023; Da'an Dist., Taipei City 106213, Taiwan.
Taiwan Patent Office; Office Action for Serial No. 111112261; May 23, 2023; 9 pgs [w/translation]; TW.
The International Bureau of Wipo, International Preliminary Report on Patentability, International Application No. PCT/US2016/42850, Jan. 25, 2018.
The United States Patent and Trademark Office, Final Office Action, U.S. Appl. No. 16/375,675, filed Jan. 17, 2020.
The United States Patent and Trademark Office, Non-Final Office Action, U.S. Appl. No. 15/213,129, filed Oct. 6, 2017.
The United States Patent and Trademark Office, Non-Final Office Action, U.S. Appl. No. 16/375,675, filed Jun. 28, 2019.
U.S. Department of Energy; Waste-to-Energy From Municipal Solid Wastes; Aug. 2019; 36 pages; US.
United States International Searching Authority; International Search Report & Written Opinion for PCT/US2016/042850; Sep. 28, 2016; 15 pages; Alexandria, VA; US.
United States International Searching Authority; International Search Report & Written Opinion for PCT/US2022/015693; May 6, 2022; 9 pages; Alexandria, VA; US.
United States International Searching Authority; International Search Report & Written Opinion for PCT/US2022/015665; May 23, 2022; 10 pages; Alexandria, VA; US.
United States International Searching Authority; International Search Report & Written Opinion for PCT/US2022/020657; Jun. 16, 2022; 10 pages; Alexandria, VA.
Wikipedia, Convolutional neural network, 18 pages https://en.wikipedia.org/w/index.php?title=Convolutional_neural_network, downloaded from Internet on May 1, 2018.
Wikipedia, TensorFlow, 4 pages https://en.wikipedia.org/w/index.php?title=TensorFlow&oldid=835761390, downloaded from Internet on May 1, 2018.
Wikipedia; Digital image processing; Retrieved from https://en.wikipedia.org/w/index.php?title=Digital_image_processing&oldid=1015648152; at least as early as Apr. 2, 2021; Wikimedia Foundation, Inc.; US.
Wikipedia; Machine vision; Retrieved from https://en.wikipedia.org/w/index.php?title=Machine_vision&oldid=1021673757; at least as early as May 6, 2021; Wikimedia Foundation, Inc.; US.
Wikipedia; Plastic recycling; Retrieved from "https://en.wikipedia.org/w/index.php?title=Plastic_recycling&oldid=1067847730" Jan. 25, 2022; Wikimedia Foundation, Inc; US.
Wikipedia; Spectral imaging; Retrieved from "https://en.wikipedia.org/w/index.php?title=Spectral_imaging&oldid=1066379790"; Jan. 18, 2022; Wikimedia Foundation, Inc; US.
Zhang, et al.; Designing and verifying a disassembly line approach to cope with the upsurge of end-of-life vehicles in China:, Elsevier, Waste Management 2018, Retrieved on Jul. 10, 2022 from <https://isiarticles.com/budles/Article/pre/pdf/98926.pdf>.
Zhou et al.; SSA-CNN: Semantic Self-Attention CNN for Pedestrian Detetion:; arXiv: 1902.09080v3 [cs. CF] Jun. 6, 2019. Retrieved o Oct. 10, 2022; Retrieved from <URL: https://arxivorg/pdf/1902.09080.pdf>.
International Searching Authority, International Search Report and The Written Opinion of the International Searching Authority, International Application No. PCT/US2022/035011, Oct. 27, 2022; 9 pages.
United States International Searching Authority; International Search Report & Written Opinion for PCT/US2022/016869; Jun. 29, 2022; 11 pages.
United States International Searching Authority; International Search Report & Written Opinion for PCT/US2022/060626; May 2, 2023; 12 pages.
United States International Searching Authority; International Search Report & Written Opinion for PCT/US2022/051681; Mar. 20, 2023; 6 pages.
United States International Searching Authority; International Search Report & Written Opinion for PCT/US2022/039622; Oct. 28, 2022; 12 pages.
United States International Searching Authority; International Search Report & Written Opinion for PCT/US2022/035013; Sep. 23, 2022; 7 pages.
Mach Vision New High Technology Equipment—Machinex, Jun. 8, 2021, downloaded from https://www.machinexrecycling.com/news/mach-vision-new-high-technology-equipment/, 1 page.
BHS and NRT Introduce Max-AI™; Bulk Handling Systems (BHS); Apr. 18, 2017; downloaded from https://max-ai.com/autonomous-qc/ on Apr. 18, 2024.
United States International Searching Authority; International Search Report & Written Opinion for PCT/US2022/030943; Sep. 28, 2022; 10 pages; Alexandria, VA.
The United States Patent and Trademark Office, Non-Final Office Action, U.S. Appl. No. 16/358,374, filed Jun. 28, 2019.
The United States Patent and Trademark Office, Non-Final Office Action, U.S. Appl. No. 16/358,374, filed Dec. 12, 2019.
The United States Patent and Trademark Office, Non-Final Office Action, U.S. Appl. No. 15/963,755, filed Apr. 5, 2019.
The United States Patent and Trademark Office, Non-Final Office Action, U.S. Appl. No. 15/963,755, filed Sep. 13, 2019.
The United States Patent and Trademark Office, Non-Final Office Action, U.S. Appl. No. 15/963,755, filed May 11, 2020.
The United States Patent and Trademark Office, Non-Final Office Action, U.S. Appl. No. 17/491,415, filed Nov. 15, 2021.
The United States Patent and Trademark Office, Non-Final Office Action, U.S. Appl. No. 17/673,694, filed Jan. 25, 2024.
The United States Patent and Trademark Office, Non-Final Office Action, U.S. Appl. No. 17/696,831, filed Mar. 29, 2024.
The United States Patent and Trademark Office, Non-Final Office Action, U.S. Appl. No. 17/495,291, filed Oct. 27, 2023.
The United States Patent and Trademark Office, Non-Final Office Action, U.S. Appl. No. 17/972,507, filed Jun. 20, 2024.
United States International Searching Authority; International Search Report & Written Opinion for PCT/US2024/017756; Jun. 17, 2024; 12 pages.
United States International Searching Authority; International Search Report & Written Opinion for PCT/US2024/017762; Jun. 17, 2024; 15 pages.
United States International Searching Authority; International Search Report & Written Opinion for PCT/US2023/077485; Feb. 21, 2024; 9 pages.

(56) References Cited

OTHER PUBLICATIONS

Taiwan Patent Office; Office Action dated Jun. 5, 2024 for Serial No. 111107059; 25 pages (with translation).

* cited by examiner

| Alloy | Product | Si | Mg | Fe | Mn | Cu | Zn | Al |
|---|---|---|---|---|---|---|---|---|
| | | % | % | % | % | % | % | % |
| 3105 | Home Siding | 0.6 | 0.2–0.8 | 0.7 | 0.3–0.8 | 0.3 | 0.4 | Remaining % |
| 5052 | Sheet Metal | 0.25 | 2.2–2.8 | 0.4 | 0.1 | 0.1 | 0.1 | Remaining % |
| 5083 | Sheet Metal | 0.4 | 4.0–4.9 | 0.4 | 0.4–1.0 | 0.1 | 0.25 | Remaining % |
| 6061 | Extrusions | 0.4–0.8 | 0.8–1.2 | 0.7 | 0.15 | 0.15–0.4 | 0.25 | Remaining % |
| 380 | Cast Engines | 7.5–9.5 | 0.1 | 1.3–2.0 | 0.5 | 3.0–4.0 | 3.0 | Remaining % |

FIG. 2

| Melt Test Result | Si | Mg | Fe | Mn | Cu | Zn | Al |
|---|---|---|---|---|---|---|---|
| | % | % | % | % | % | % | % |
| Aggregate of Sorted Materials | 5.2 | 3.05 | 0.46 | 0.26 | 1.48 | 0.78 | Remaining % |

FIG. 3

SORTING BASED ON CHEMICAL COMPOSITION

This application is a continuation of U.S. Ser. No. 17/696,831 (issued as U.S. Pat. No. 12,017,255 on Jun. 25, 2024), which claims priority to U.S. Provisional Patent Application Ser. No. 63/249,069 and to U.S. Provisional Patent Application Ser. No. 63/285,964. U.S. Ser. No. 17/696,831 is a continuation-in-part application of U.S. patent application Ser. No. 17/667,397 (issued as U.S. Pat. No. 11,969,764), which claims priority to U.S. Provisional Patent Application Ser. No. 63/146,892 and to U.S. Provisional Patent Application Ser. No. 63/173,301, and which is a continuation-in-part application of U.S. patent application Ser. No. 17/495,291 (issued as U.S. Pat. No. 11,975,365), which is a continuation of U.S. patent application Ser. No. 17/380,928, which is a continuation-in-part application of U.S. patent application Ser. No. 17/227,245 (issued as U.S. Pat. No. 11,964,304), which is a continuation-in-part application of U.S. patent application Ser. No. 16/939,011 (issued as U.S. Pat. No. 11,471,916), which is a continuation application of U.S. patent application Ser. No. 16/375,675 (issued as U.S. Pat. No. 10,722,922), which is a continuation-in-part application of U.S. patent application Ser. No. 15/963,755 (issued as U.S. Pat. No. 10,710,119), which claims priority to U.S. Provisional Patent Application Ser. No. 62/490,219, and which is a continuation-in-part application of U.S. patent application Ser. No. 15/213,129 (issued as U.S. Pat. No. 10,207,296), which claims priority to U.S. Provisional Patent Application Ser. No. 62/193,332, which are all hereby incorporated by reference herein. U.S. patent application Ser. No. 17/495,291 is also a continuation-in-part application of U.S. patent application Ser. No. 17/491,415 (issued as U.S. Pat. No. 11,278,937), which is a continuation-in-part application of U.S. patent application Ser. No. 16/852,514 (issued as U.S. Pat. No. 11,260,426), which is a divisional application of U.S. patent application Ser. No. 16/358,374 (issued as U.S. Pat. No. 10,625,304), which is a continuation-in-part application of U.S. patent application Ser. No. 15/963,755 (issued as U.S. Pat. No. 10,710,119), which are all hereby incorporated by reference herein.

GOVERNMENT LICENSE RIGHTS

This disclosure was made with U.S. government support under Grant No. DE-AR0000422 awarded by the U.S. Department of Energy. The U.S. government may have certain rights in this disclosure.

TECHNOLOGY FIELD

The present disclosure relates in general to the sorting of materials, and in particular, to the sorting of materials to achieve a specific composition of chemical elements within the sorted materials.

BACKGROUND INFORMATION

Recycling is the process of collecting and processing materials that would otherwise be thrown away as trash, and turning them into new products. Recycling has benefits for communities and for the environment, since it reduces the amount of waste sent to landfills and incinerators, conserves natural resources, increases economic security by tapping a domestic source of materials, prevents pollution by reducing the need to collect new raw materials, and saves energy. After collection, recyclables are generally sent to a material recovery facility to be sorted, cleaned, and processed into materials that can be used in manufacturing.

BRIEF DESCRIPTION OF THE DRAWINGS

FIG. 2 illustrates a table listing chemical compositions for common aluminum alloys.

FIG. 3 illustrates a table listing a chemical composition for an exemplary aluminum alloy to be produced in accordance with embodiments of the present disclosure.

DETAILED DESCRIPTION

Figure 1:
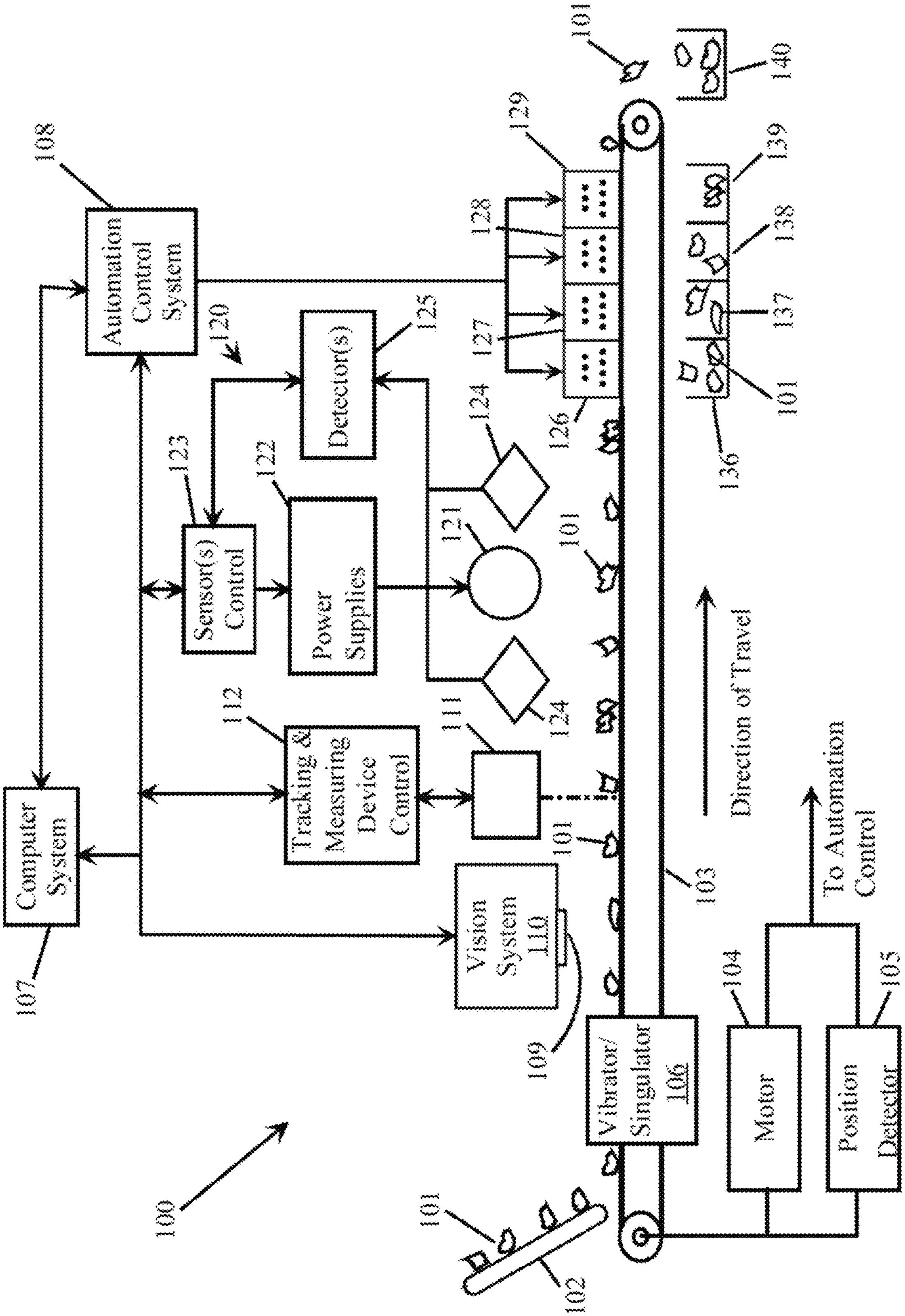
FIG. 1 illustrates a schematic of a sorting system configured in accordance with embodiments of the present disclosure.

Various detailed embodiments of the present disclosure are disclosed herein. However, it is to be understood that the disclosed embodiments are merely exemplary of the disclosure, which may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to employ various embodiments of the present disclosure.

As used herein, "chemical element" means a chemical element of the periodic table of chemical elements, including chemical elements that may be discovered after the filing date of this application. As used herein, a "material" may include a solid composed of a compound or mixture of one or more chemical elements, wherein the complexity of a compound or mixture may range from being simple to complex (all of which may also be referred to herein as a material having a specific "chemical composition").

As used herein, an "aggregate chemical composition" means the composition of chemical elements and their relative percentages by weight (wt %) within a collection or group of individual, separate material pieces. (Note that the percentage by weight (or weight percentage) is also referred to as the mass fraction, which is the percentage of the mass of a specific chemical element within a material or substance to the total mass of the material or substance.) For example, if a collection of individual pieces of metal alloys were melted together, the resultant "melt" would possess a chemical composition equivalent to the aggregate chemical composition. As referenced herein, a "melt" is when selected material pieces are melted together, and a composition analysis is performed on the melted together material pieces to determine the percentages (e.g., percentages by weight) of the various chemical elements existing within the melt.

Classes of materials may include metals (ferrous and nonferrous), metal alloys, plastics (including, but not limited to, PCB, HDPE, UHMWPE, and various colored plastics), rubber, foam, glass (including, but not limited to, borosilicate or soda lime glass, and various colored glass), ceramics, paper, cardboard, Teflon, PE, bundled wires, insulation covered wires, rare earth elements, leaves, wood, plants, parts of plants, textiles, bio-waste, packaging, electronic waste, batteries, accumulators, scrap pieces from end-of-life vehicles, mining, construction, and demolition waste, crop wastes, forest residues, purpose-grown grasses, woody energy crops, microalgae, urban food waste, food waste, hazardous chemical and biomedical wastes, construction debris, farm wastes, biogenic items, non-biogenic items, objects with a specific carbon content, any other objects that may be found within municipal solid waste, and any other objects, items, or materials disclosed herein, including further types or classes of any of the foregoing that can be distinguished from each other, including but not limited to, by one or more sensor systems, including but not limited to, any of the sensor technologies disclosed herein. Within this disclosure, the terms "scrap," "scrap pieces," "materials," "material pieces," and "pieces" may be used interchangeably. As used herein, a material piece or scrap piece referred to as having a metal alloy composition is a metal alloy having a specific chemical composition that distinguishes it from other metal alloys.

As well known in the industry, a "polymer" is a substance or material composed of very large molecules, or macromolecules, composed of many repeating subunits. A polymer may be a natural polymer found in nature or a synthetic polymer.

"Multilayer polymer films" are composed of two or more different compositions and may possess a thickness of up to about $7.5^{-8} \times 10^{-4}$ m. The layers are at least partially contiguous and preferably, but optionally, coextensive.

As used herein, the terms "plastic," "plastic piece," and "piece of plastic material" (all of which may be used interchangeably) refer to any object that includes or is composed of a polymer composition of one or more polymers and/or multilayer polymer films.

As used herein, the term "chemical signature" refers to a unique pattern (e.g., fingerprint spectrum), as would be produced by one or more analytical instruments, indicating the presence of one or more specific elements or molecules (including polymers) in a sample. The elements or molecules may be organic and/or inorganic. Such analytical instruments include any of the sensor systems disclosed herein. In accordance with embodiments of the present disclosure, one or more sensor systems disclosed herein may be configured to produce a chemical signature of a material piece (e.g., a plastic piece).

As used here in, a "fraction" refers to any specified combination of organic and/or inorganic elements or molecules, polymer types, plastic types, polymer compositions, chemical signatures of plastics, physical characteristics of the plastic piece (e.g., color, transparency, strength, melting point, density, shape, size, manufacturing type, uniformity, reaction to stimuli, etc.), etc., including any and all of the various classifications and types of plastics disclosed herein. Non-limiting examples of fractions are one or more different types of plastic pieces that contain: LDPE plus a relatively high percentage of aluminum; LDPE and PP plus a relatively low percentage of iron; PP plus zinc; combinations of PE, PET, and HDPE; any type of red-colored LDPE plastic pieces; any combination of plastic pieces excluding PVC; black-colored plastic pieces; combinations of #3-#7 type plastics that contain a specified combination of organic and inorganic molecules; combinations of one or more different types of multi-layer polymer films; combinations of specified plastics that do not contain a specified contaminant or additive; any types of plastics with a melting point greater than a specified threshold; any thermoset plastic of a plurality of specified types; specified plastics that do not contain chlorine; combinations of plastics having similar densities; combinations of plastics having similar polarities; plastic bottles without attached caps or vice versa.

"Catalytic pyrolysis" involves the degradation of the polymeric materials by heating them in the absence of oxygen and in the presence of a catalyst.

The term "predetermined" refers to something that has been established or decided in advance.

"Spectral imaging" is imaging that uses multiple bands across the electromagnetic spectrum. While an ordinary camera captures light across three wavelength bands in the visible spectrum, red, green, and blue ("RGB"), spectral imaging encompasses a wide variety of techniques that include but go beyond RGB. Spectral imaging may use the infrared, visible, ultraviolet, and/or x-ray spectrums, or some combination of the above. Spectral data, or spectral image data, is a digital data representation of a spectral image. Spectral imaging may include the acquisition of spectral data in visible and non-visible bands simultaneously, illumination from outside the visible range, or the use of optical filters to capture a specific spectral range. It is also possible to capture hundreds of wavelength bands for each pixel in a spectral image.

As used herein, the term "image data packet" refers to a packet of digital data pertaining to a captured spectral image of an individual material piece.

As used herein, the terms "classify," "identify," "select," and "recognize" and the terms "classification," "identification," "selection," and "recognition" and any derivatives of the foregoing, may be utilized interchangeably. As used herein, to "classify" a material piece is to determine (i.e., identify) a type or class of materials to which the material piece belongs (or at least should belong according to sensed characteristics of that material piece). For example, in accordance with certain embodiments of the present disclosure, a sensor system (as further described herein) may be configured to collect and analyze any type of information for classifying materials, which classifications can be utilized within a sorting system to selectively sort material pieces as a function of a set of one or more sensed physical and/or chemical characteristics (e.g., which may be user-defined), including but not limited to, color, texture, hue, shape, brightness, weight, density, composition, size, uniformity, manufacturing type, chemical signature, predetermined fraction, radioactive signature, transmissivity to light, sound, or other signals, and reaction to stimuli such as various fields, including emitted and/or reflected electromagnetic radiation ("EM") of the material pieces. As used herein, "manufacturing type" refers to the type of manufacturing process by which the material piece was manufactured, such as a metal part having been formed by a wrought process, having been cast (including, but not limited to, expendable mold casting, permanent mold casting, and powder metallurgy), having been forged, a material removal process, etc.

The types or classes (i.e., classification) of materials may be user-definable and not limited to any known classification of materials. The granularity of the types or classes may range from very coarse to very fine. For example, the types or classes may include plastics, ceramics, glasses, metals, and other materials, where the granularity of such types or classes is relatively coarse; different metals and metal alloys such as, for example, zinc, copper, brass, chrome plate, and aluminum, where the granularity of such types or classes is finer; or between specific subclasses of metal alloys, where the granularity of such types or classes is relatively fine. Thus, the types or classes may be configured to distinguish between materials of significantly different compositions such as, for example, plastics and metal alloys, or to distinguish between materials of substantially similar or almost identical chemical composition such as, for example, different subclasses of metal alloys. It should be appreciated that the methods and systems discussed herein may be applied to identify/classify pieces of material for which the chemical composition is completely unknown before being classified.

As referred to herein, a "conveyor system" may be any known piece of mechanical handling equipment that moves materials from one location to another, including, but not limited to, an aero-mechanical conveyor, automotive conveyor, belt conveyor, belt-driven live roller conveyor, bucket conveyor, chain conveyor, chain-driven live roller conveyor, drag conveyor, dust-proof conveyor, electric track vehicle system, flexible conveyor, gravity conveyor, gravity skatewheel conveyor, lineshaft roller conveyor, motorized-drive roller conveyor, overhead I-beam conveyor, overland conveyor, pharmaceutical conveyor, plastic belt conveyor, pneumatic conveyor, screw or auger conveyor, spiral conveyor, tubular gallery conveyor, vertical conveyor, vibrating conveyor, and wire mesh conveyor.

The systems and methods described herein according to certain embodiments of the present disclosure receive a mixture of a plurality of material pieces, wherein at least one material piece within this mixture includes a chemical composition (e.g., a metal alloy composition, a chemical signature) different from one or more other material pieces, and/or at least one material piece within this mixture was manufactured differently from one or more other materials, and/or at least one material piece within this mixture is distinguishable (e.g., visually discernible characteristics or features, different chemical signatures, etc.) from other material pieces, and the systems and methods are configured to accordingly identify/classify/sort this material piece. Embodiments of the present disclosure may be utilized to sort any types or classes of materials, or fractions, as defined herein.

Figure 6:
FIG. 6 shows visual images of exemplary material pieces from cast aluminum.
Figure 7:
FIG. 7 shows visual images of exemplary material pieces from aluminum extrusions.
Figure 8:
FIG. 8 shows visual images of exemplary material pieces from wrought aluminum.

It should be noted that the material pieces to be sorted may have irregular sizes and shapes (e.g., see FIGS. 6-8). For example, materials (e.g., Zorba and/or Twitch) may have been previously run through some sort of shredding mechanism that chops up the material into such irregularly shaped and sized pieces (producing scrap pieces), which may then be fed or deposited onto a conveyor system.

Embodiments of the present disclosure will be described herein as sorting material pieces into such separate groups or collections by physically depositing (e.g., diverting or ejecting) the material pieces into separate receptacles or receptacles, or onto another conveyor system, as a function of user-defined groupings or collections (e.g., a predetermined specific aggregate chemical composition, specific material type classifications or fractions). As an example, within certain embodiments of the present disclosure, material pieces may be sorted into separate receptacles or receptacles in order to separate material pieces composed of a specific chemical composition, or compositions, from other material pieces composed of a different specific chemical composition in order to produce a predetermined specific aggregate chemical composition within the collection or group of sorted material pieces. In a non-limiting example, a collection of Twitch that includes various aluminum alloys (e.g., various different wrought and/or cast aluminum alloys), may be sorted in accordance with embodiments of the present disclosure in order to produce an aluminum alloy having a desired chemical composition (which may include an aluminum alloy having a unique chemical composition different from known aluminum alloys).

FIG. 1 illustrates an example of a system 100 configured in accordance with various embodiments of the present disclosure. A conveyor system 103 may be implemented to convey one or more streams (organized or random) of individual material pieces 101 through the system 100 so that each of the individual material pieces 101 can be tracked, classified, and sorted into predetermined desired groups or collections (e.g., one or more predetermined specific aggregate chemical compositions). Such a conveyor system 103 may be implemented with one or more conveyor belts on which the material pieces 101 travel, typically at a predetermined constant speed. However, certain embodiments of the present disclosure may be implemented with other types of conveyor systems (as disclosed herein), including a system in which the material pieces free fall past selected components of the system 100 (or any other type of vertical sorter), or a vibrating conveyor system. Hereinafter, wherein applicable, the conveyor system 103 may also be referred to as the conveyor belt 103. In one or more embodiments, some or all of the acts of conveying, tracking, stimulating, detecting, classifying, and sorting may be performed automatically, i.e., without human intervention. For example, in the system 100, one or more sources of stimuli, one or more emissions detectors, a classification module, a sorting apparatus, and/or other system components may be configured to perform these and other operations automatically.

Furthermore, though the simplified illustration in FIG. 1 depicts a single stream of material pieces 101 on a conveyor belt 103, embodiments of the present disclosure may be implemented in which a plurality of such streams of material pieces are passing by the various components of the system 100 in parallel with each other. For example, as further described in U.S. Pat. No. 10,207,296, the material pieces may be distributed into two or more parallel singulated streams travelling on a single conveyor belt, or a set of parallel conveyor belts. In accordance with certain embodiments of the present disclosure, incorporation or use of a singulator is not required. Instead, the conveyor system (e.g., the conveyor system 103) may simply convey a mass of material pieces, which have been deposited onto the conveyor system 103 in a random manner (or deposited in mass onto the conveyor system 103 and then caused to separate, such as by a vibrating mechanism). As such, certain embodiments of the present disclosure are capable of simultaneously tracking, classifying, and/or sorting a plurality of such conveyed material pieces.

In accordance with certain embodiments of the present disclosure, some sort of suitable feeder mechanism (e.g., another conveyor system or hopper 102) may be utilized to feed the material pieces 101 onto the conveyor system 103, whereby the conveyor system 103 conveys the material pieces 101 past various components within the system 100. After the material pieces 101 are received by the conveyor system 103, an optional tumbler/vibrator/singulator 106 may be utilized to separate the individual material pieces from a combined mass of material pieces. Within certain embodiments of the present disclosure, the conveyor system 103 is operated to travel at a predetermined speed by a conveyor system motor 104. This predetermined speed may be programmable and/or adjustable by the operator in any well-known manner. Monitoring of the predetermined speed of the conveyor system 103 may alternatively be performed with a position detector 105. Within certain embodiments of the present disclosure, control of the conveyor system motor 104 and/or the position detector 105 may be performed by an automation control system 108. Such an automation control system 108 may be operated under the control of a computer system 107 and/or the functions for performing the automation control may be implemented in software within the computer system 107.

Thus, as will be further described herein, through the utilization of the controls to the conveyor belt drive motor 104 and/or the automation control system 108 (and alternatively including the position detector 105), as each of the material pieces 101 travelling on the conveyor belt 103 are identified, they can be tracked by location and time (relative to the various components of the system 100) so that various components of the system 100 can be activated/deactivated as each material piece 101 passes within their vicinity. As a result, the automation control system 108 is able to track the location of each of the material pieces 101 while they travel along the conveyor belt 103.

In accordance with certain embodiments of the present disclosure, after the material pieces 101 are received by the conveyor belt 103, a tumbler and/or a vibrator may be utilized to separate the individual material pieces from a mass (e.g., a physical pile) of material pieces. In accordance with alternative embodiments of the present disclosure, the material pieces may be positioned into one or more singulated (i.e., single file) streams, which may be performed by an active or passive singulator 106. An example of a passive singulator is further described in U.S. Pat. No. 10,207,296. As previously discussed, incorporation or use of a singulator is not required. Instead, the conveyor system (e.g., the conveyor belt 103) may simply convey a collection of material pieces, which have been deposited onto the conveyor belt 103 in a random manner.

Referring again to FIG. 1, certain embodiments of the present disclosure may utilize a vision, or optical recognition, system 110 and/or a material tracking and measuring device 111 to track each of the material pieces 101 as they travel on the conveyor belt 103. The vision system 110 may utilize one or more still or live action cameras 109 to note the position (i.e., location and timing) of each of the material pieces 101 on the moving conveyor belt 103.

The vision system 110 may be further, or alternatively, configured to perform certain types of identification (e.g., classification) of all or a portion of the material pieces 101, as will be further described herein. For example, such a vision system 110 may be utilized to capture or acquire information about each of the material pieces 101. For example, the vision system 110 may be configured (e.g., with a machine learning system) to capture or collect any type of information from the material pieces that can be utilized within the system 100 to classify and/or selectively sort the material pieces 101 as a function of a set of one or more characteristics (e.g., physical and/or chemical and/or radioactive, etc.) as described herein. In accordance with certain embodiments of the present disclosure, the vision system 110 may capture visual images of each of the material pieces 101 (including one-dimensional, two-dimensional, three-dimensional, or holographic imaging), for example, by using an optical sensor as utilized in typical digital cameras and video equipment. Such visual images captured by the optical sensor are then stored in a memory device as image data (e.g., formatted as image data packets). In accordance with certain embodiments of the present disclosure, such image data may represent images captured within optical wavelengths of light (i.e., the wavelengths of light that are observable by the typical human eye). However, alternative embodiments of the present disclosure may utilize sensor systems that are configured to capture an image of a material made up of wavelengths of light outside of the visual wavelengths of the human eye. All such images may also be referred to herein as spectral images.

In accordance with certain embodiments of the present disclosure, the system 100 may be implemented with one or more sensor systems 120, which may be utilized solely or in combination with the vision system 110 to classify/identify material pieces 101. A sensor system 120 may be configured with any type of sensor technology, including sensor systems utilizing irradiated or reflected electromagnetic radiation (e.g., utilizing infrared ("IR"), Fourier Transform IR ("FTIR"), Forward-looking Infrared ("FLIR"), Very Near Infrared ("VNIR"), Near Infrared ("NIR"), Short Wavelength Infrared ("SWIR"), Long Wavelength Infrared ("LWIR"), Medium Wavelength Infrared ("MWIR" or "MIR"), X-Ray Transmission ("XRT"), Gamma Ray, Ultraviolet ("UV"), X-Ray Fluorescence ("XRF"), Laser Induced Breakdown Spectroscopy ("LIBS"), Raman Spectroscopy, Anti-stokes Raman Spectroscopy, Gamma Spectroscopy, Hyperspectral Spectroscopy (e.g., any range beyond visible wavelengths), Acoustic Spectroscopy, NMR Spectroscopy, Microwave Spectroscopy, Terahertz Spectroscopy, and including one-dimensional, two-dimensional, three-dimensional, or holographic imaging with any of the foregoing), or by any other type of sensor technology, including but not limited to, chemical or radioactive. Implementation of an exemplary XRF system (e.g., for use as a sensor system 120 herein) is further described in U.S. Pat. No. 10,207,296.

It should be noted that though FIG. 1 is illustrated with a combination of a vision system 110 and one or more sensor systems 120, embodiments of the present disclosure may be implemented with any combination of sensor systems utilizing any of the sensor technologies disclosed herein, or any other sensor technologies currently available or developed in the future. Though FIG. 1 is illustrated as including one or more sensor systems 120, implementation of such sensor system(s) is optional within certain embodiments of the present disclosure. Within certain embodiments of the present disclosure, a combination of both the vision system 110 and one or more sensor systems 120 may be used to classify the material pieces 101. Within certain embodiments of the present disclosure, any combination of one or more of the different sensor technologies disclosed herein may be used to classify the material pieces 101 without utilization of a vision system 110. Furthermore, embodiments of the present disclosure may include any combinations of one or more sensor systems and/or vision systems in which the outputs of such sensor and/or vision systems are processed within a machine learning system (as further disclosed herein) in order to classify/identify materials from a mixture of materials, which may then be sorted from each other. If a sorting system (e.g., system 100) is configured to operate solely with such a vision system(s) 110, then the sensor system(s) 120 may be omitted from the system 100 (or simply deactivated).

Figure 4:
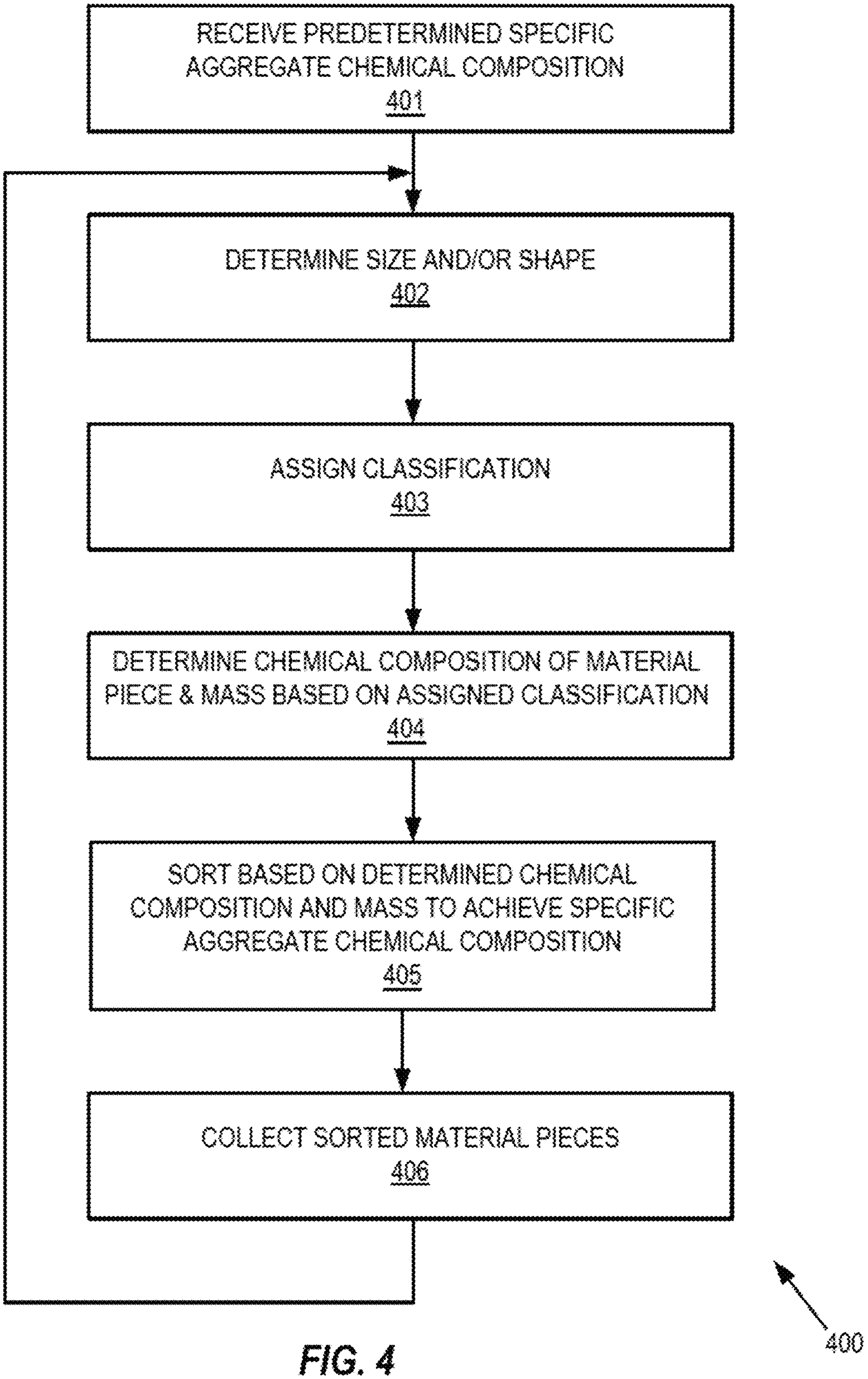
FIG. 4 illustrates a flowchart diagram configured in accordance with embodiments of the present disclosure.

In accordance with certain embodiments of the present disclosure, and as further described herein with respect to FIG. 4, a vision system 110 and/or sensor system(s) may be configured to identify which of the material pieces 101 are not of the kind to be sorted by the system 100 for inclusion within a collection to produce a specific aggregate chemical composition (e.g., material pieces containing a specific contaminant or chemical element), and send a signal to not divert such material pieces along with the other sorted material pieces.

Within certain embodiments of the present disclosure, the material tracking and measuring device 111 and accompanying control system 112 may be utilized and configured to measure the sizes and/or shapes of each of the material pieces 101 as they pass within proximity of the material tracking and measuring device 111, which may be utilized by the system 100 to determine the approximate masses of each of the material pieces, along with the position (i.e., location and timing) of each of the material pieces 101 on the moving conveyor system 103. Alternatively, the vision system 110 may be utilized to track the position (i.e., location and timing) of each of the material pieces 101 as they are transported by the conveyor system 103.

Figure 5:
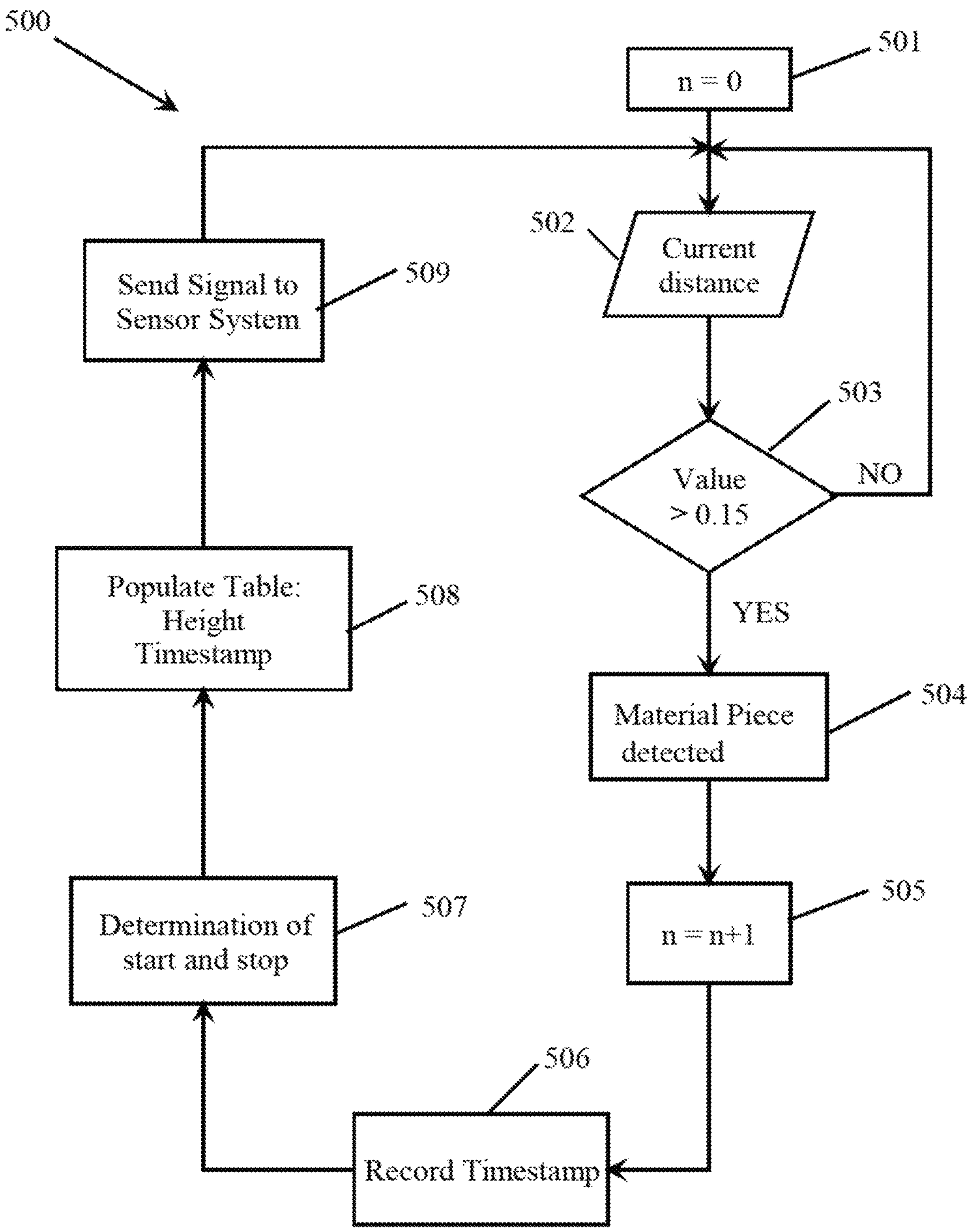
FIG. 5 illustrates a flowchart diagram configured for determining sizes of material pieces in accordance with embodiments of the present disclosure.

A non-limiting, exemplary operation of such a material tracking and measuring device 111 and control system 112 is described herein with respect to FIG. 5. Such a material tracking and measuring device 111 may be implemented with a well-known laser light system, which continuously measures a distance the laser light travels before being reflected back into a detector of the laser light system. As such, as each of the material pieces 101 passes within proximity of the device 111, it outputs a signal to the control system 112 indicating such distance measurements. Therefore, such a signal may substantially represent an intermittent series of pulses whereby the baseline of the signal is produced as a result of a measurement of the distance between the device 111 and the conveyor belt 103 during those moments when a material piece is not in the proximity of the device 111, while each pulse provides a measurement of the distance between the device 111 and a material piece 101 passing by on the conveyor belt 103. Since the material pieces 101 may have irregular shapes, such a pulse signal may also occasionally have an irregular height. Nevertheless, each pulse signal generated by the device 111 may provide the height of portions of each of the material pieces 101 as they pass by on the conveyor belt 103. The length of each of such pulses also provides a measurement of a length of each of the material pieces 101 measured along a line substantially parallel to the direction of travel of the conveyor belt 103. It is this length measurement (corresponding to the time stamp of process block 506 of FIG. 5) (and alternatively the height measurements) that may be utilized within embodiments of the present disclosure to determine or at least approximate the mass of each material piece 101, which may then be utilized to assist in the sorting of the material pieces as further described herein.

Referring next to FIG. 5, there is illustrated a flowchart diagram of an exemplary system and process 500 for determining the approximate sizes, shapes, and/or masses of each material piece. Such a system and process 500 may be implemented within any of the vision/optical recognition systems and/or a material tracking and measuring device described herein, such as the material tracking and measuring device 111 and control system 112 illustrated in FIG. 1. In the process block 501, the material tracking and measuring device may be initialized at n=0 whereby n represents a condition whereby a first material piece to be conveyed along the conveyor system has yet to be measured. As previously described, such a material tracking and measuring device may establish a baseline signal representing the distance between the material tracking and measuring device and the conveyor belt absent any presence of an object (i.e., a material piece) carried thereon. In process block 502, the material tracking and measuring device produces a continuous, or substantially continuous, measurement of distance. Process block 503 represents a decision within the material tracking and measuring device whether the detected distance has changed from a predetermined threshold amount. Recall that once the system 100 has been initiated, at some point in time, a material piece 101 will travel along the conveyor system in sufficient proximity to the material tracking and measuring device as to be detected by the employed mechanism by which distances are measured. In embodiments of the present disclosure, this may occur when a travelling material piece 101 passes within the line of a laser light utilized for measuring distances. Once an object, such as a material piece 101, begins to be detected by the material tracking and measuring device (e.g., a laser light), the distance measured by the material tracking and measuring device will change from its baseline value. The material tracking and measuring device may be predetermined to only detect the presence of a material piece 101 passing within its proximity if a height of any portion of the material piece 101 is greater than the predetermined threshold distance value. FIG. 5 shows an example whereby such a threshold value is 0.15 (e.g., representing 0.15 mm), though embodiments of the present disclosure should not be limited to any particular value.

The system and process 500 will continue (i.e., repeat process blocks 502-503) to measure the current distance as long as this threshold distance value has not been reached. Once a measured height greater than the threshold value has been detected, the process will proceed to process block 504 to record that a material piece 101 passing within proximity of the material tracking and measuring device has been detected on the conveyor system. Thereafter, in process block 505, the variable n may be incremented to indicate to the system 100 that another material piece 101 has been detected on the conveyor system. This variable n may be utilized in assisting with tracking of each of the material pieces 101. In process block 506, a time stamp is recorded for the detected material piece 101, which may be utilized by the system 100 to track the specific location and timing of a detected material piece 101 as it travels on the conveyor system, while also representing a length of the detected material piece 101. In optional process block 507, this recorded time stamp may then be utilized for determining when to activate (start) and deactivate (stop) the acquisition of a sensor-initiated measurement signal (e.g., an x-ray fluorescence spectrum from a material piece 101) associated with the time stamp. The start and stop times of the time stamp may correspond to the aforementioned pulse signal produced by the material tracking and measuring device. In process block 508, this time stamp along with the recorded height of the material piece 101 may be recorded within a table utilized by the system 100 to keep track of each of the material pieces 101 and their resultant classification.

Thereafter, in optional process block 509, signals may then be sent to the sensor system indicating the time period in which to activate/deactivate the acquisition of a sensor-initiated measurement signal from the material piece 101, which may include the start and stop times corresponding to the length of the material piece 101 determined by the material tracking and measuring device. Embodiments of the present disclosure are able to accomplish such a task because of the time stamp and known predetermined speed of the conveyor system received from the material tracking and measuring device indicating when a leading edge of the material piece 101 will pass by the irradiating source, and when the trailing edge of the material piece 101 will thereafter pass by the irradiating source.

The system and process 500 for distance measuring of each of the material pieces 101 travelling along the conveyor system may then be repeated for each passing material piece 101.

Within certain embodiments of the present disclosure that implement one or more sensor systems 120, the one or more sensor systems 120 may be configured to assist the vision system 110 to identify the chemical composition, relative chemical compositions, and/or manufacturing types of each of the material pieces 101 as they pass within proximity of the one or more sensor systems 120. The one or more sensor systems 120 may include an energy emitting source 121, which may be powered by a power supply 122, for example, in order to stimulate a response from each of the material pieces 101.

In accordance with certain embodiments of the present disclosure that implement an XRF system as a sensor system 120, the source 121 may include an in-line x-ray fluorescence ("IL-XRF") tube, such as further described within U.S. Pat. No. 10,207,296. Such an IL-XRF tube may include a separate x-ray source each dedicated for one or more streams (e.g., singulated) of conveyed material pieces. In such a case, the one or more detectors 124 may be implemented as XRF detectors to detect fluoresced x-rays from material pieces 101 within each of the singulated streams.

Within certain embodiments of the present disclosure, as each material piece 101 passes within proximity to the emitting source 121, a sensor system 120 may emit an appropriate sensing signal towards the material piece 101. One or more detectors 124 may be positioned and configured to sense/detect one or more characteristics from the material piece 101 in a form appropriate for the type of utilized sensor technology. The one or more detectors 124 and the associated detector electronics 125 capture these received sensed characteristics to perform signal processing thereon and produce digitized information representing the sensed characteristics (e.g., spectral data), which is then analyzed in accordance with certain embodiments of the present disclosure, which may be used in order to classify (solely or in combination with the vision system 110) each of the material pieces 101. This classification, which may be performed within the computer system 107, may then be utilized by the automation control system 108 to activate one of the N (N≥1) sorting devices 126 . . . 129 of a sorting apparatus for sorting (e.g., diverting/ejecting) the material pieces 101 into one or more N (N≥1) sorting receptacles 136 . . . 139 according to the determined classifications. Four sorting devices 126 . . . 129 and four sorting receptacles 136 . . . 139 associated with the sorting devices are illustrated in FIG. 1 as merely a non-limiting example.

The sorting apparatus may include any well-known mechanisms for redirecting selected material pieces 101 towards a desired location, including, but not limited to, diverting the material pieces 101 from the conveyor belt system into a plurality of sorting receptacles. For example, a sorting apparatus may utilize air jets, with each of the air jets assigned to one or more of the classifications. When one of the air jets (e.g., 127) receives a signal from the automation control system 108, that air jet emits a stream of air that causes a material piece 101 to be diverted/ejected from the conveyor system 103 into a sorting bin (e.g., 137) corresponding to that air jet.

Other mechanisms may be used to divert/eject the material pieces, such as robotically removing the material pieces from the conveyor belt, pushing the material pieces from the conveyor belt (e.g., with paint brush type plungers), causing an opening (e.g., a trap door) in the conveyor system 103 from which a material piece may drop, or using air jets to divert the material pieces into separate receptacles as they fall from the edge of the conveyor belt. A pusher device, as that term is used herein, may refer to any form of device which may be activated to dynamically displace an object on or from a conveyor system/device, employing pneumatic, mechanical, or other means to do so, such as any appropriate type of mechanical pushing mechanism (e.g., an ACME screw drive), pneumatic pushing mechanism, or air jet pushing mechanism. Some embodiments may include multiple pusher devices located at different locations and/or with different diversion path orientations along the path of the conveyor system. In various different implementations, these sorting systems describe herein may determine which pusher device to activate (if any) depending on classifications of material pieces performed by the machine learning system. Moreover, the determination of which pusher device to activate may be based on the detected presence and/or characteristics of other objects that may also be within the diversion path of a pusher device concurrently with a target item (e.g., a classified material piece). Furthermore, even for facilities where singulation along the conveyor system is not perfect, the disclosed sorting systems can recognize when multiple objects are not well singulated, and dynamically select from a plurality of pusher devices which should be activated based on which pusher device provides the best diversion path for potentially separating objects within close proximity. In some embodiments, objects identified as target objects may represent material that should be diverted off of the conveyor system. In other embodiments, objects identified as target objects represent material that should be allowed to remain on the conveyor system so that non-target materials are instead diverted.

In addition to the N sorting receptacles 136 . . . 139 into which material pieces 101 are diverted/ejected, the system 100 may also include a receptacle 140 that receives material pieces 101 not diverted/ejected from the conveyor system 103 into any of the aforementioned sorting receptacles 136 . . . 139. For example, a material piece 101 may not be diverted/ejected from the conveyor system 103 into one of the N sorting receptacles 136 . . . 139 when the classification of the material piece 101 is not determined (or simply because the sorting devices failed to adequately divert/eject a piece), when the material piece 101 contains a contaminant detected by the vision system 110 and/or the sensor system 120, or because the material piece 101 is not required to produce a particular aggregate chemical composition. Alternatively, the receptacle 140 may be used to receive one or more classifications of material pieces that have deliberately not been assigned to any of the N sorting receptacles 136 . . . 139. These such material pieces may then be further sorted in accordance with other characteristics and/or by another sorting system.

Depending upon the specific requirements of the predetermined specific aggregate chemical composition, multiple classifications may be mapped to a single sorting device and associated receptacle. In other words, there need not be a one-to-one correlation between classifications and receptacles. For example, it may be desired by the user to sort certain classifications of materials into the same receptacle in order to achieve a particular aggregate chemical composition. To accomplish this sort, when a material piece 101 is classified as meeting one or more requirements for achieving the particular aggregate chemical composition, the same sorting device may be activated to sort these into the same receptacle. Such combination sorting may be applied to produce any desired combination of sorted material pieces (e.g., one or more particular aggregate chemical compositions). The mapping of classifications may be programmed by the user (e.g., using the sorting algorithm (e.g., see FIG. 4) operated by the computer system 107) to produce such desired combinations. Additionally, the classifications of material pieces are user-definable, and not limited to any particular known classifications of material pieces.

Within certain embodiments of the present disclosure, the conveyor system 103 may be divided into multiple belts configured in series such as, for example, two belts, where a first belt conveys the material pieces past the vision system 110 and/or an implemented sensor systems(s) 120, and a second belt conveys the certain sorted material pieces past an implemented sensor system 120 for a subsequent sort. Moreover, such a second conveyor belt may be at a lower height than the first conveyor belt, such that the material pieces fall from the first belt onto the second belt.

Within certain embodiments of the present disclosure that implement a sensor system 120, the emitting source 121 may be located above the detection area (i.e., above the conveyor system 103); however, certain embodiments of the present disclosure may locate the emitting source 121 and/or detectors 124 in other positions that still produce acceptable sensed/detected physical characteristics.

It should be appreciated that, although the systems and methods described herein are described primarily in relation to classifying material pieces in solid state, the disclosure is not so limited. The systems and methods described herein may be applied to classifying a material having any of a range of physical states, including, but not limited to a liquid, molten, gaseous, or powdered solid state, another state, and any suitable combination thereof.

Regardless of the type(s) of sensed characteristics/information captured of the material pieces, the information may then be sent to a computer system (e.g., computer system 107) to be processed by a machine learning system in order to identify and/or classify each of the material pieces. Such a machine learning system may implement any well-known machine learning system, including one that implements a neural network (e.g., artificial neural network, deep neural network, convolutional neural network, recurrent neural network, autoencoders, reinforcement learning, etc.), supervised learning, unsupervised learning, semi-supervised learning, reinforcement learning, self learning, feature learning, sparse dictionary learning, anomaly detection, robot learning, association rule learning, fuzzy logic, artificial intelligence ("AI"), deep learning algorithms, deep structured learning hierarchical learning algorithms, support vector machine ("SVM") (e.g., linear SVM, nonlinear SVM, SVM regression, etc.), decision tree learning (e.g., classification and regression tree ("CART"), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.) and/or deep machine learning algorithms, such as those described in and publicly available at the deeplearning.net website (including all software, publications, and hyperlinks to available software referenced within this website), which is hereby incorporated by reference herein. Non-limiting examples of publicly available machine learning software and libraries that could be utilized within embodiments of the present disclosure include Python, OpenCV, Inception, Theano, Torch, PyTorch, Pylearn2, Numpy, Blocks, TensorFlow, MXNet, Caffe, Lasagne, Keras, Chainer, Matlab Deep Learning, CNTK, MatConvNet (a MATLAB toolbox implementing convolutional neural networks for computer vision applications), DeepLearnToolbox (a Matlab toolbox for Deep Learning (from Rasmus Berg Palm)), BigDL, Cuda-Convnet (a fast C++/CUDA implementation of convolutional (or more generally, feed-forward) neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT (Python code using CUDAMat and Gnumpy to train models of natural images), ConvNet, Elektronn, OpenNN, NeuralDesigner, Theano Generalized Hebbian Learning, Apache Singa, Lightnet, and SimpleDNN.

In accordance with certain embodiments of the present disclosure, machine learning may be performed in two stages. For example, first, training occurs, which may be performed offline in that the system 100 is not being utilized to perform actual classifying/sorting of material pieces. The system 100 may be utilized to train the machine learning system in that homogenous sets (also referred to herein as control samples) of material pieces (i.e., having the same types or classes of materials, or falling within the same predetermined fraction) are passed through the system 100 (e.g., by a conveyor system 103); and all such material pieces may not be sorted, but may be collected in a common receptacle (e.g., receptacle 140). Alternatively, the training may be performed at another location remote from the system 100, including using some other mechanism for collecting sensed information (characteristics) of control sets of material pieces. During this training stage, algorithms within the machine learning system extract features from the captured information (e.g., using image processing techniques well known in the art). Non-limiting examples of training algorithms include, but are not limited to, linear regression, gradient descent, feed forward, polynomial regression, learning curves, regularized learning models, and logistic regression. It is during this training stage that the algorithms within the machine learning system learn the relationships between materials and their features/characteristics (e.g., as captured by the vision system and/or sensor system(s)), creating a knowledge base for later classification of a mixture of material pieces received by the system 100. Such a knowledge base may include one or more libraries, wherein each library includes parameters (e.g., neural network parameters) for utilization by the machine learning system in classifying material pieces. For example, one particular library may include parameters configured by the training stage to recognize and classify a particular type or class of material, or one or more materials that fall with a predetermined fraction. In accordance with certain embodiments of the present disclosure, such libraries may be inputted into the machine learning system and then the user of the system 100 may be able to adjust certain ones of the parameters in order to adjust an operation of the system 100 (for example, adjusting the threshold effectiveness of how well the machine learning system recognizes a particular material piece from a mixture of materials).

Additionally, the inclusion of certain materials (e.g., chemical elements or compounds) in material pieces (e.g., metal alloys), or combinations of certain chemical elements or compounds, can result in identifiable physical features (e.g., visually discernible characteristics) in materials. As a result, when a plurality of material pieces containing such a particular composition are passed through the aforementioned training stage, the machine learning system can learn how to distinguish such material pieces from others. Consequently, a machine learning system configured in accordance with certain embodiments of the present disclosure may be configured to sort between material pieces as a function of their respective chemical compositions. For example, such a machine learning system may be configured so that different aluminum alloys can be sorted as a function of the percentage of a specified alloying material contained within the aluminum alloys.

For example, FIG. 6 shows captured or acquired images of exemplary material pieces of cast aluminum alloys, which may be used during the aforementioned training stage. FIG. 7 shows captured or acquired images of exemplary material pieces of extruded aluminum alloys, which may be used during the aforementioned training stage. FIG. 8 shows captured or acquired images of exemplary material pieces of wrought aluminum alloys, which may be used during the aforementioned training stage. During the training stage, a plurality of material pieces of a particular (homogenous) classification (type) of material, which are the control samples, may be delivered past the vision system and/or one or more sensor system(s) (e.g., by a conveyor system) so that the algorithms within the machine learning system detect, extract, and learn what features (e.g., visually discernible characteristics) represent such a type or class of material. In other words, images of cast aluminum alloy material pieces such as shown in FIG. 6 may be passed through such a training stage so that the algorithms within the machine learning system "learn" (are trained) how to detect, recognize, and classify material pieces composed of cast aluminum alloys. In the case of training a vision system (e.g., the vision system 110), trained to visually discern between material pieces. This creates a library of parameters specific to cast aluminum alloy material pieces. Then, the same process can be performed with respect to images of extruded aluminum alloy material pieces, such as shown in FIG. 7, creating a library of parameters particular to extruded aluminum alloy material pieces. And, the same process can be performed with respect to images of wrought aluminum alloy material pieces, such as shown in FIG. 8, creating a library of parameters particular to wrought aluminum alloy material pieces. As can be seen with the exemplary images of cast aluminum alloys shown in FIG. 6, such cast aluminum alloy materials have visually discernible features such as sharp, defined angles. As can be seen with the exemplary images of extruded aluminum alloys shown in FIG. 7, such extruded aluminum alloy materials have visually discernible features such as rounded corners and a hammer texture. As can be seen with the exemplary images of wrought aluminum alloys shown in FIG. 8, such wrought aluminum alloy materials have visually discernible features such as folding of the material and a more smooth texture than what exists for cast and extruded.

Embodiments of the present disclosure are not limited to the materials illustrated in FIGS. 6-8. For each type of material to be classified by the vision system, any number of exemplary material pieces of that type of material may be passed by the vision system. Given a captured sensed information as input data, the algorithms within the machine learning system may use N classifiers, each of which test for one of N different material types, classes, or fractions. Note that the machine learning system may be "taught" (trained) to detect any type, class, or fraction of material, including any of the types, classes, or fractions of materials found within MSW, or any other material in which its chemical composition results in visually discernible features.

After parameters within the algorithms have been established and the machine learning system has sufficiently learned (been trained) the differences (e.g., visually discernible differences) for the material classifications (e.g., within a user-defined level of statistical confidence), the libraries for the different material classifications are then implemented into a material classifying and/or sorting system (e.g., system 100) to be used for identifying and/or classifying material pieces from a mixture of material pieces, and then sorting such classified material pieces if sorting is to be performed (e.g., to produce a specific aggregate chemical composition).

Techniques to construct, optimize, and utilize a machine learning system are known to those of ordinary skill in the art as found in relevant literature. Examples of such literature include the publications: Krizhevsky et al., "*ImageNet Classification with Deep Convolutional Networks*," Proceedings of the 25th International Conference on Neural Information Processing Systems, Dec. 3-6, 2012, Lake Tahoe, Nev.; and LeCun et al., "*Gradient-Based Learning Applied to Document Recognition*," Proceedings of the IEEE, Institute of Electrical and Electronic Engineers (IEEE), November 1998, both of which are hereby incorporated by reference herein in their entirety.

Figure 11:
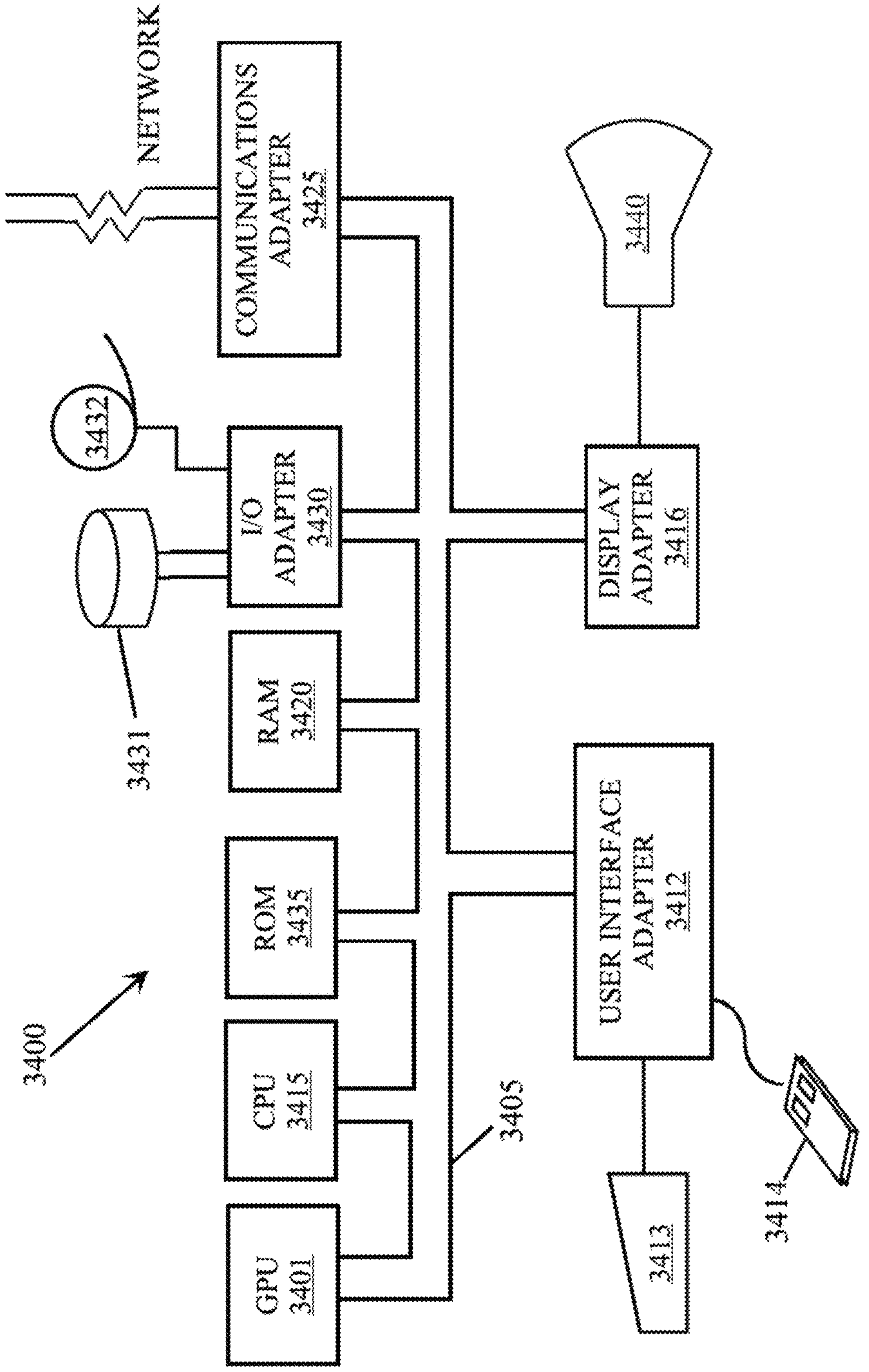
FIG. 11 illustrates a block diagram of a data processing system configured in accordance with embodiments of the present disclosure.

In an exemplary technique, data captured by a sensor and/or vision system with respect to a particular material piece may be processed as an array of data values within a data processing system (e.g., the data processing system 3400 of FIG. 11 implementing (configured with) a machine learning system). For example, the data may be spectral data captured by a digital camera or other type of sensor system with respect to a particular material piece and processed as an array of data values (e.g., image data packets). Each data value may be represented by a single number, or as a series of numbers representing values. These values may be multiplied by neuron weight parameters (e.g., with a neural network), and may possibly have a bias added. This may be fed into a neuron nonlinearity. The resulting number output by the neuron can be treated much as the values were, with this output multiplied by subsequent neuron weight values, a bias optionally added, and once again fed into a neuron nonlinearity. Each such iteration of the process is known as a "layer" of the neural network. The final outputs of the final layer may be interpreted as probabilities that a material is present or absent in the captured data pertaining to the material piece. Examples of such a process are described in detail in both of the previously noted "*ImageNet Classification with Deep Convolutional Networks*" and "*Gradient-Based Learning Applied to Document Recognition*" references.

In accordance with certain embodiments of the present disclosure in which a neural network is implemented, as a final layer (the "classification layer"), the final set of neurons' output is trained to represent the likelihood a material piece is associated with the captured data. During operation, if the likelihood that a material piece is associated with the captured data is over a user-specified threshold, then it is determined that the material piece is indeed associated with the captured data. These techniques can be extended to determine not only the presence of a type of material associated with particular captured data, but also whether sub-regions of the particular captured data belong to one type of material or another type of material. This process is known as segmentation, and techniques to use neural networks exist in the literature, such as those known as "fully convolutional" neural networks, or networks that otherwise include a convolutional portion (i.e., are partially convolutional), if not fully convolutional. This allows for material location and size to be determined.

It should be understood that the present disclosure is not exclusively limited to machine learning techniques. Other common techniques for material classification/identification may also be used. For instance, a sensor system may utilize optical spectrometric techniques using multi- or hyper-spectral cameras to provide a signal that may indicate the presence or absence of a type, class, or fraction of material by examining the spectral emissions (i.e., spectral imaging) of the material. Spectral images of a material piece may also be used in a template-matching algorithm, wherein a database of spectral images is compared against an acquired spectral image to find the presence or absence of certain types of materials from that database. A histogram of the captured spectral image may also be compared against a database of histograms. Similarly, a bag of words model may be used with a feature extraction technique, such as scale-invariant feature transform ("SIFT"), to compare extracted features between a captured spectral image and those in a database.

Therefore, as disclosed herein, certain embodiments of the present disclosure provide for the identification/classification of one or more different types, classes, or fractions of materials in order to determine which material pieces should be diverted from a conveyor system (i.e., sorted) in defined groups (e.g., in accordance with one or more predetermined specific aggregate chemical compositions). In accordance with certain embodiments, machine learning techniques are utilized to train (i.e., configure) a neural network to identify a variety of one or more different types, classes, or fractions of materials. Spectral images, or other types of sensed information, are captured of materials (e.g., traveling on a conveyor system), and based on the identification/classification of such materials, the systems described herein can decide which material piece should be allowed to remain on the conveyor system, and which should be diverted/removed from the conveyor system (for example, either into a collection receptacle, or diverted onto another conveyor system).

In accordance with certain embodiments of the present disclosure, a machine learning system for an existing installation (e.g., the system 100) may be dynamically reconfigured to identify/classify characteristics of a new type, class, or fraction of materials by replacing a current set of neural network parameters with a new set of neural network parameters.

A point of mention here is that, in accordance with certain embodiments of the present disclosure, the detected/captured features/characteristics (e.g., spectral images) of the material pieces may not be necessarily simply particularly identifiable or discernible physical characteristics; they can be abstract formulations that can only be expressed mathematically, or not mathematically at all; nevertheless, the machine learning system may be configured to parse the spectral data to look for patterns that allow the control samples to be classified during the training stage. Furthermore, the machine learning system may take subsections of captured information (e.g., spectral images) of a material piece and attempt to find correlations between the pre-defined classifications.

In accordance with certain embodiments of the present disclosure, instead of utilizing a training stage whereby control samples of material pieces are passed by the vision system and/or sensor system(s), training of the machine learning system may be performed utilizing a labeling/annotation technique whereby as data/information of material pieces are captured by a vision/sensor system, a user inputs a label or annotation that identifies each material piece, which is then used to create the library for use by the machine learning system when classifying material pieces within a mixture of material pieces.

In accordance with certain embodiments of the present disclosure, any sensed characteristics output by any of the sensor systems 120 disclosed herein may be input into a machine learning system in order to classify and/or sort materials. For example, in a machine learning system implementing supervised learning, sensor system 120 outputs that uniquely characterize a specific type or composition of material (e.g., a specific metal alloy) may be used to train the machine learning system.

Figure 9:
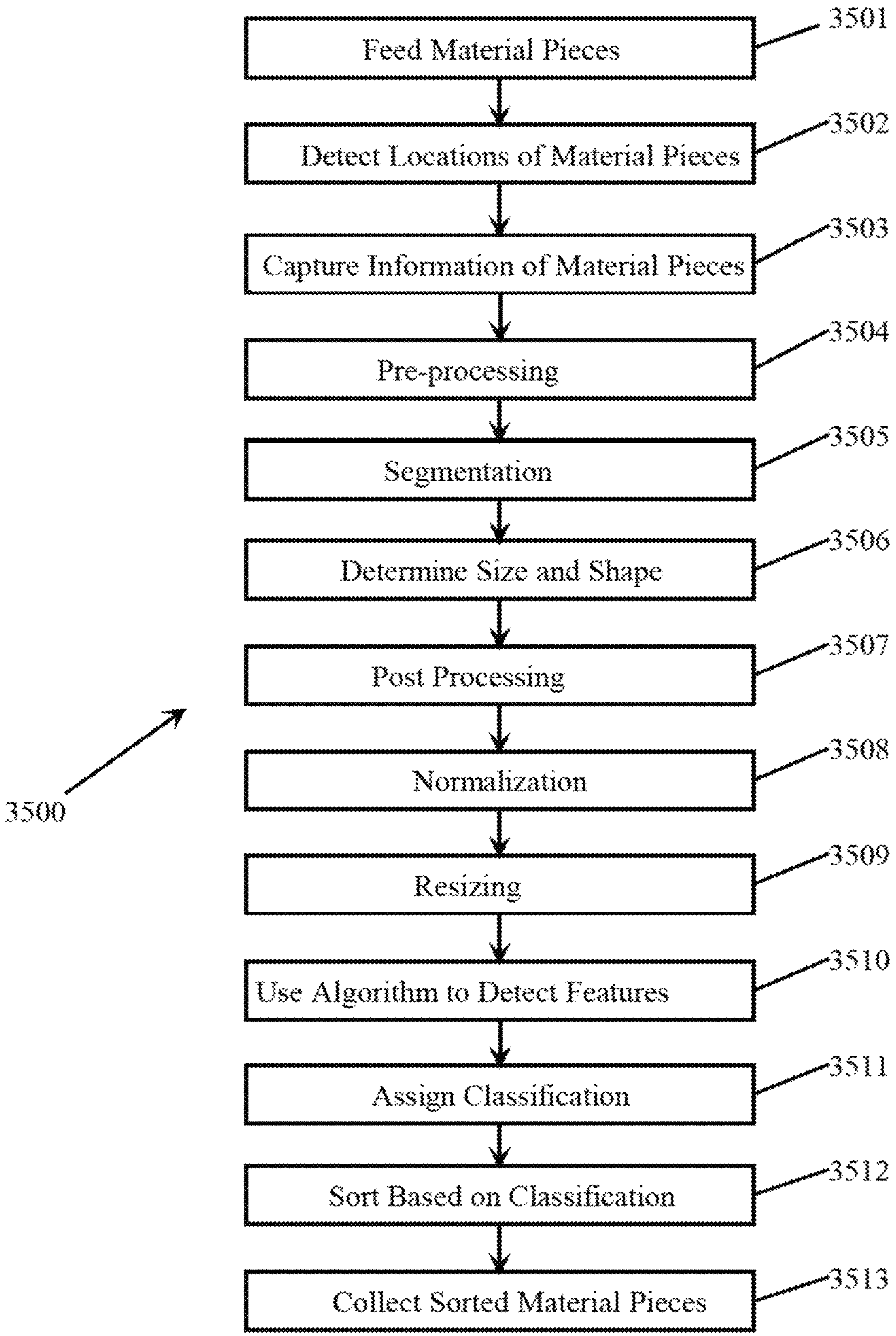
FIG. 9 illustrates a flowchart diagram configured in accordance with embodiments of the present disclosure.

FIG. 9 illustrates a flowchart diagram depicting exemplary embodiments of a process 3500 of classifying/sorting material pieces utilizing a vision system 110 and/or one or more sensor systems 120 in accordance with certain embodiments of the present disclosure. The process 3500 may be performed to classify a mixture of material pieces into any combination of predetermined types, classes, and/or fractions, including to produce a predetermined specific aggregate chemical composition. The process 3500 may be configured to operate within any of the embodiments of the present disclosure described herein, including the system 100 of FIG. 1. As will be further described, the process 3500 may be utilized within the system and process 400 of FIG. 4. Operation of the process 3500 may be performed by hardware and/or software, including within a computer system (e.g., computer system 3400 of FIG. 11) controlling the system (e.g., the computer system 107, the vision system 110, and/or the sensor system(s) 120 of FIG. 1).

In the process block 3501, the material pieces 101 may be deposited onto a conveyor system 103. In the process block 3502, the location on the conveyor system 103 of each material piece 101 is detected for tracking of each material piece 101 as it travels through the system 100. This may be performed by the vision system 110 (for example, by distinguishing a material piece 101 from the underlying conveyor system material while in communication with a conveyor system position detector (e.g., the position detector 105)). Alternatively, a material tracking device 111 can be used to track the material pieces 101. Or, any system that can create a light source (including, but not limited to, visual light, UV, and IR) and has a corresponding detector can be used to track the material pieces 101. In the process block 3503, when a material piece 101 has traveled in proximity to one or more of the vision system 110 and/or the sensor system(s) 120, sensed information/characteristics of the material piece 101 is captured/acquired. In the process block 3504, a vision system (e.g., implemented within the computer system 107), such as previously disclosed, may perform pre-processing of the captured information, which may be utilized to detect (extract) information of each of the material pieces 101 (e.g., from the background (e.g., the conveyor belt 103); in other words, the pre-processing may be utilized to identify the difference between the material piece 101 and the background). Well-known image processing techniques such as dilation, thresholding, and contouring may be utilized to identify the material piece 101 as being distinct from the background. In the process block 3505, segmentation may be performed. For example, the captured information may include information pertaining to one or more material pieces 101. Additionally, a particular material piece 101 may be located on a seam of the conveyor belt 103 when its image is captured. Therefore, it may be desired in such instances to isolate the image of an individual material piece 101 from the background of the image. In an exemplary technique for the process block 3505, a first step is to apply a high contrast of the image; in this fashion, background pixels are reduced to substantially all black pixels, and at least some of the pixels pertaining to the material piece 101 are brightened to substantially all white pixels. The image pixels of the material piece 101 that are white are then dilated to cover the entire size of the material piece 101. After this step, the location of the material piece 101 is a high contrast image of all white pixels on a black background. Then, a contouring algorithm can be utilized to detect boundaries of the material piece 101. The boundary information is saved, and the boundary locations are then transferred to the original image. Segmentation is then performed on the original image on an area greater than the boundary that was earlier defined. In this fashion, the material piece 101 is identified and separated from the background.

In the optional process block 3506, the material pieces 101 may be conveyed along the conveyor system 103 within proximity of the material tracking and measuring device 111 and/or a sensor system 120 in order to determine a size and/or shape of the material pieces 101. Such a material tracking and measuring device 111 may be configured to measure one or more dimensions of each material piece so that the system can calculate (determine) an approximate mass of each material piece. In the process block 3507, post processing may be performed. Post processing may involve resizing the captured information/data to prepare it for use in the machine learning system. This may also include modifying certain properties (e.g., enhancing image contrast, changing the image background, or applying filters) in a manner that will yield an enhancement to the capability of the machine learning system to classify the material pieces 101. In the process block 3509, the data may be resized. Data resizing may be desired under certain circumstances to match the data input requirements for certain machine learning systems, such as neural networks. For example, neural networks may require much smaller image data sizes (e.g., 225×255 pixels or 299×299 pixels) than the sizes of the images captured by typical digital cameras. Moreover, the smaller the input data size, the less processing time is needed to perform the classification. Thus, smaller data sizes can increase the throughput of the system 100 and increase its value.

In the process blocks 3510 and 3511, each material piece 101 is identified/classified based on the sensed/detected features. For example, the process block 3510 may be configured with a neural network employing one or more machine learning algorithms, which compare the extracted features with those stored in a previously generated knowledge base (e.g., generated during a training stage), and assigns the classification with the highest match to each of the material pieces 101 based on such a comparison. The algorithms of the machine learning system may process the captured information/data in a hierarchical manner by using automatically trained filters. The filter responses are then successfully combined in the next levels of the algorithms until a probability is obtained in the final step. In the process block 3511, these probabilities may be used for each of the N classifications to decide into which of the N sorting receptacles the respective material pieces 101 should be sorted. Each of the N classifications may pertain to N different predetermined specific aggregate chemical compositions. For example, each of the N classifications may be assigned to one sorting receptacle, and the material piece 101 under consideration is sorted into that receptacle that corresponds to the classification returning the highest probability larger than a predefined threshold. Within embodiments of the present disclosure, such predefined thresholds may be preset by the user. A particular material piece 101 may be sorted into an outlier receptacle (e.g., sorting receptacle 140) if none of the probabilities is larger than the predetermined threshold.

Next, in the process block 3512, a sorting device 126 . . . 129 corresponding to the classification, or classifications, of the material piece 101 is activated. Between the time at which the image of the material piece 101 was captured and the time at which the sorting device 126 . . . 129 is activated, the material piece 101 has moved from the proximity of the vision system 110 and/or sensor system(s) 120 to a location downstream on the conveyor system 103 (e.g., at the rate of conveying of a conveyor system). In embodiments of the present disclosure, the activation of the sorting device 126 . . . 129 is timed such that as the material piece 101 passes the sorting device 126 . . . 129 mapped to the classification of the material piece 101, the sorting device 126 . . . 129 is activated, and the material piece 101 is diverted/ejected from the conveyor system 103 into its associated sorting receptacle 136 . . . 139. Within embodiments of the present disclosure, the activation of a sorting device 126 . . . 129 may be timed by a respective position detector that detects when a material piece 101 is passing before the sorting device 126 . . . 129 and sends a signal to enable the activation of the sorting device 126 . . . 129. In the process block 3513, the sorting receptacle 136 . . . 139 corresponding to the sorting device 126 . . . 129 that was activated receives the diverted/ejected material piece 101.

Figure 10:
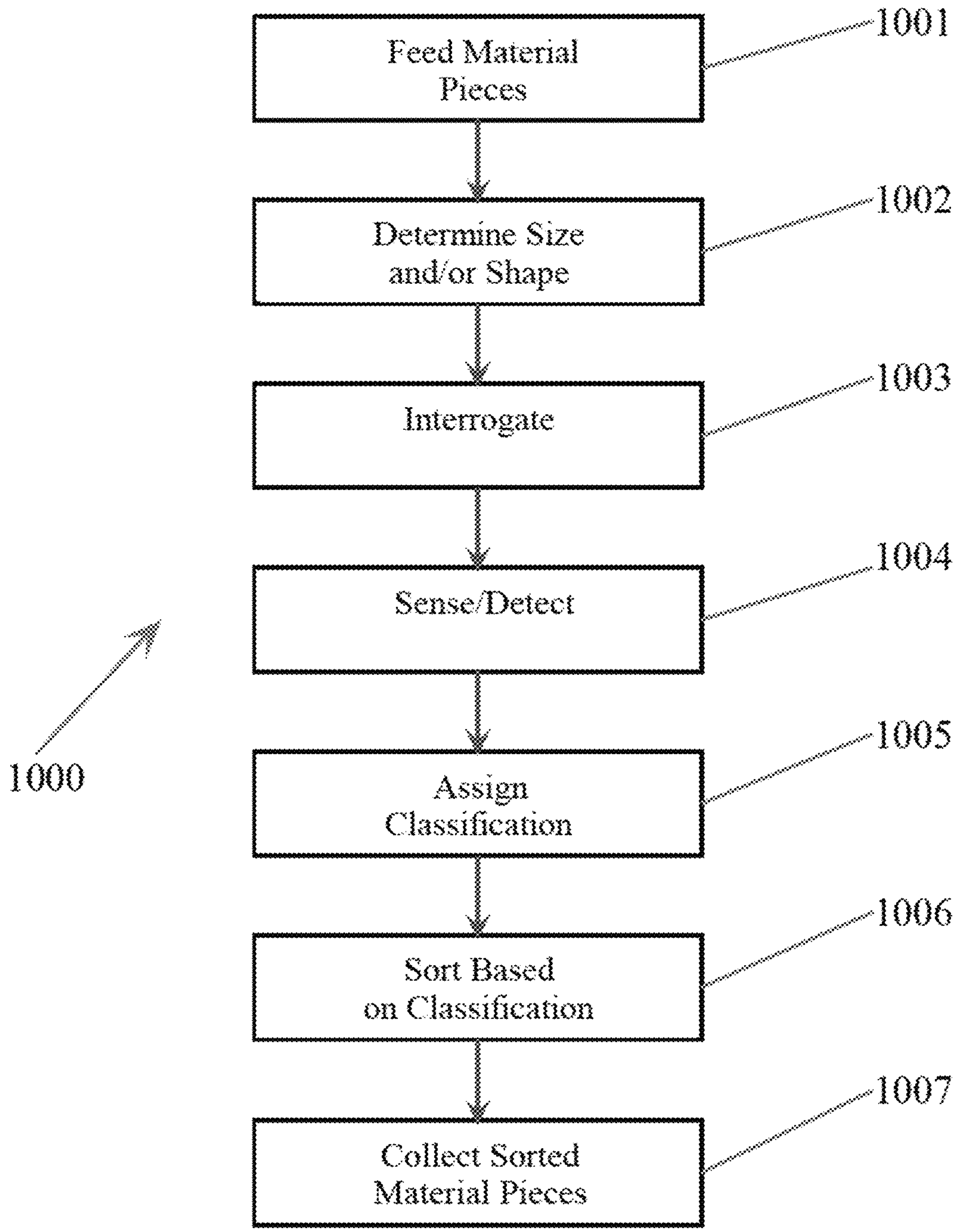
FIG. 10 illustrates a flowchart diagram configured in accordance with embodiments of the present disclosure.

FIG. 10 illustrates a flowchart diagram depicting exemplary embodiments of a process 1000 for classifying/sorting material pieces 101 in accordance with certain embodiments of the present disclosure. The process 1000 may be configured to operate within any of the embodiments of the present disclosure described herein, including the system 100 of FIG. 1. As will be further described, the process 1000 may be utilized within the system and process 400 of FIG. 4.

The process 1000 may be configured to operate in conjunction with the process 3500. For example, in accordance with certain embodiments of the present disclosure, the process blocks 1003 and 1004 may be incorporated in the process 3500 (e.g., operating in series or in parallel with the process blocks 3503-3510) in order to combine the efforts of a vision system 110 that is implemented in conjunction with a machine learning system with a sensor system (e.g., a sensor system 120) that is not implemented in conjunction with a machine learning system in order to classify and/or sort material pieces 101, including in accordance with the system and method 400 of FIG. 4.

Operation of the process 1000 may be performed by hardware and/or software, including within a computer system (e.g., computer system 3400 of FIG. 11) controlling various aspects of the system 100 (e.g., the computer system 107 of FIG. 1). In the process block 1001, the material pieces 101 may be deposited onto a conveyor system 103. Next, in the optional process block 1002, the material pieces 101 may be conveyed along the conveyor system 103 within proximity of a material tracking and measuring device 111 and/or an optical imaging system in order to track each material piece and/or determine a size and/or shape of the material pieces 101. Such a material tracking and measuring device 111 may be configured to measure one or more dimensions of each material piece so that the system can calculate (determine) an approximate mass of each material piece. In the process block 1003, when a material piece 101 has traveled in proximity of the sensor system 120, the material piece 101 may be interrogated, or stimulated, with EM energy (waves) or some other type of stimulus appropriate for the particular type of sensor technology utilized by the sensor system 120. In the process block 1004, physical characteristics of the material piece 101 are sensed/detected and captured by the sensor system 120. In the process block 1005, for at least some of the material pieces 101, the type of material is identified/classified based (at least in part) on the captured characteristics, which may be combined with the classification by the machine learning system in conjunction with the vision system 110 (e.g., when performed in combination with the process 3500).

Next, if sorting of the material pieces 101 is to be performed, in the process block 1006, a sorting device 126 . . . 129 corresponding to the classification, or classifications, of the material piece 101 is activated. Between the time at which the material piece was sensed and the time at which the sorting device 126 . . . 129 is activated, the material piece 101 has moved from the proximity of the sensor system 120 to a location downstream on the conveyor system 103, at the rate of conveying of the conveyor system. In certain embodiments of the present disclosure, the activation of the sorting device 126 . . . 129 is timed such that as the material piece 101 passes the sorting device 126 . . . 129 mapped to the classification of the material piece 101, the sorting device 126 . . . 129 is activated, and the material piece 101 is diverted/ejected from the conveyor system 103 into its associated sorting receptacle 136 . . . 139. Within certain embodiments of the present disclosure, the activation of a sorting device 126 . . . 129 may be timed by a respective position detector that detects when a material piece 101 is passing before the sorting device 126 . . . 129 and sends a signal to enable the activation of the sorting device 126 . . . 129. In the process block 1007, the sorting receptacle 136 . . . 139 corresponding to the sorting device 126 . . . 129 that was activated receives the diverted/ejected material piece 101.

In accordance with various embodiments of the present disclosure, different types or classes of materials may be classified by different types of sensors each for use with a machine learning system, and combined to classify material pieces in a stream of scrap or waste.

In accordance with various embodiments of the present disclosure, data (e.g., spectral data) from two or more sensors can be combined using a single or multiple machine learning systems to perform classifications of material pieces.

In accordance with various embodiments of the present disclosure, multiple sensor systems can be mounted onto a single conveyor system, with each sensor system utilizing a different machine learning system. In accordance with various embodiments of the present disclosure, multiple sensor systems can be mounted onto different conveyor systems, with each sensor system utilizing a different machine learning system.

In accordance with embodiments of the present disclosure, the system 100 may be configured (e.g., in accordance with the system and method 400 of FIG. 4) to output a collection of sorted materials that in the aggregate possesses a specific chemical composition (i.e., a predetermined specific aggregate chemical composition). In other words, if such a collection of sorted materials were, or at least theoretically could be, combined into a singular object or mass (e.g., melted together or mixed into a solution), such a singular object or mass would then possess the specific chemical composition. Moreover, embodiments of the present disclosure can be configured to output a collection of materials possessing a specific chemical composition not present within any individual material piece fed into the system 100.

A non-limiting example would be the production of an aluminum alloy possessing a chemical composition according to a predetermined (e.g., as designed by the user of the system 100) combination of specific weight percentages (wt. %) of aluminum, silicon, magnesium, iron, manganese, copper, and zinc. The scrap pieces of aluminum alloys available to be fed into the system 100 may be those listed in the table of FIG. 2. And, it may be desired to produce from a sorting of such available aluminum alloy scrap pieces an aluminum alloy possessing a chemical composition substantially equivalent to the one listed in the table of FIG. 3. However, even though the system 100 can be configured to distinguish between each of the aluminum alloys listed in the table of FIG. 2 (i.e., by classification of each of the aluminum alloy pieces 101 in accordance with either or both of the processes 1000 and 3500), none of these aluminum alloys possess a chemical composition equivalent to the chemical composition listed in the table of FIG. 3. Therefore, sorting out scrap pieces composed of any one of the aluminum alloys listed in the table of FIG. 2 would not result in a collection of aluminum alloy scrap pieces possessing, in the aggregate, a chemical composition equivalent to the chemical composition listed in the table of FIG. 3.

However, embodiments of the present disclosure can be configured to produce a collection of aluminum alloy scrap pieces possessing an aggregate chemical composition equivalent, or at least substantially equivalent, to the chemical composition listed in the table of FIG. 3. This is accomplished by utilizing one or more of the vision system 110 and/or the sensor system(s) 120 to classify, select, and sort for output a combination of a plurality of scrap pieces of the aluminum alloys of FIG. 2 in a ratio that results in the aggregate chemical composition (also referred to herein as the predetermined specific aggregate chemical composition).

Since the individual aluminum alloy scrap pieces may have different sizes, and thus different masses, the material tracking and measuring device 111 may be utilized to estimate the mass for each aluminum alloy scrap piece. For example, the sizes of each of the scrap pieces measured by the material tracking and measuring device 111 may be utilized by the system 100 to determine (calculate) a mass, or at least an approximate mass, for each scrap piece. Since the system 100 has been configured to recognize and classify each scrap piece as belonging to one of the plurality of aluminum alloys listed in the table of FIG. 2, and since the specific chemical compositions for each of the different aluminum alloys are known, the system 100 can use this information along with the determined size for each scrap piece to determine (calculate) the mass, or at least the approximate mass, of each of the different chemical elements contained within each aluminum alloy scrap piece.

To produce a collection of the aluminum alloy scrap pieces possessing the aggregate chemical composition, the system 100 is configured to then classify and select for sorting those aluminum alloy scrap pieces fed into the system 100 that, when combined, achieve the aggregate chemical composition for the combined mass of the sorted aluminum alloy scrap pieces. In other words, if such a collection of aluminum alloy scrap pieces sorted and output by the system 100 were melted together (which they are likely to be at some point), the resultant melt would possess the aggregate chemical composition, or at least substantially close to the aggregate chemical composition within a desired threshold of accuracy.

Consequently, the system 100 may be configured to calculate on a running basis the contributions to the individual masses of each of the chemical elements within the aggregate chemical composition as each aluminum alloy scrap piece is added to the sorted-out collection so that the system 100 can then determine whether the next aluminum alloy scrap piece that is classified should be added to the collection or not (i.e., sorted from a mixture of aluminum alloy scrap pieces).

FIG. 4 illustrates a flowchart block diagram of a system and process 400 configured in accordance with embodiments of the present disclosure for producing a collection of material pieces possessing a predetermined specific aggregate chemical composition. The system and process 400 may be implemented as a computer program (or other type of algorithm) performed within the system 100 (e.g., by the computer system 107). The system and process 400 may be performed in conjunction with aspects of the system and process 3500 of FIG. 9 and/or the system and process 1000 of FIG. 10.

In the process block 401, the system 100 receives, or is input with, a predetermined specific aggregate chemical composition that is desired to be produced at the output of one of the sorting devices 126 . . . 129 within the system 100. In the process block 402, as each material piece 101 is conveyed past the material tracking and measuring device 111, the material tracking and measuring device 111 will determine the size and/or shape of each of the material pieces 101 as described herein. In the process block 403, a classification is assigned to each of the material pieces 101 by the vision system 110 and/or one or more of the sensor systems 120 in a manner as described herein (e.g., see FIGS. 9 and 10). In the process block 404, the system 100 will determine the chemical composition of each of the classified material pieces 101. This may be determined directly using one or more of the sensor systems 120 that are capable of measuring and determining the weight percentages of the various chemical elements within a particular material piece, such as an XRF or LIBS system. Or, the chemical composition of each of the classified material pieces 101 may be determined indirectly, such as being inferred as a result of the classifications of the material pieces 101. For example, if the various different classes or types of the material pieces 101 fed into the system 100 are known (e.g., as previously described with respect to FIG. 2), then the specific chemical compositions for each class or type of material piece 101 may be input into the system 100 (e.g., and stored in a database), and then when a particular material piece 101 is classified (e.g., by the vision system 110 and/or one or more of the sensor systems 120), its specific chemical composition will be matched (associated in some manner) to its determined classification. Additionally, in the process block 404, the mass of each of the material pieces 101 may be approximately calculated based on the previously determined size and/or shape, and consequently, the approximate masses of each chemical element in the material piece can be determined. This can be accomplished since the relative masses of the chemical elements of various known types or classes of material pieces will be known and can be previously input into the system 100 in a similar manner as the known chemical compositions.

In the process block 405, the system 100 will sort each of the material pieces 101 based on the determined chemical compositions and masses so as to achieve the predetermined specific aggregate chemical composition. For example, the system 100 may be configured to sort (e.g., divert) each of these material pieces 101 into a predetermined receptacle (e.g., the receptacle 136) by a predetermined sorting device (e.g., the sorting device 126). The remainder of the material pieces 101 may be collected into the receptacle 140, or the system 100 may be configured to sort certain ones of the material pieces 101 into another receptacle (e.g., receptacle 137) to achieve a second (e.g., different) predetermined specific aggregate chemical composition. Alternatively, the system 100 may be configured to sort the remaining material pieces 101 based on any other type of desired classification(s), such as sorting the remaining material pieces 101 into two different classifications (e.g., wrought, extruded, and/or cast aluminum). In the process block 406, the sorted material pieces 101 for achieving the specific aggregate chemical composition are collected into the predetermined receptacle (e.g., the receptacle 136).

The process blocks 402-406 may be repeated as needed to achieve the specific aggregate chemical composition, to achieve the specific aggregate chemical composition within a specified threshold of accuracy, or to achieve the specific aggregate chemical composition for a desired (predetermined) collected mass of materials (as may be determined by counting the number of materials diverted into the receptacle). For example, as each material piece is sorted, the system may continually determine (i.e., update) the aggregate chemical composition of the then collected material pieces, and will then continue the sorting until the updated aggregate chemical composition is within a threshold level of the predetermined specific aggregate chemical composition. As each material piece is classified, the system will determine whether to divert that material piece to join the collection, such as whether that material piece would increase or decrease the aggregate weight percentage of a specific chemical element within the already sorted and collected material pieces. Additionally, the system may be configured to not divert certain material pieces into the collection because such material pieces contain a contaminant that is not desired to be included within the predetermined specific chemical composition (e.g., a wrought aluminum alloy piece that contains an iron-containing material such as a bolt). Alternatively, other systems may be implemented in order to remove material pieces that contain a particular contaminant.

The material tracking and measuring device 111 may be a well-known one-dimensional or two-dimensional line scanner. If it is a one-dimensional line scanner, then it will measure a length of each material piece along the direction of travel. If it can be assumed that the majority of material pieces are approximately equal in length and width, such a length measurement can be utilized to approximate the mass of each material piece. If a two-dimensional line scanner is utilized, then it can measure both the length and the width of each material piece for use in determining the masses.

Alternatively, one or more cameras may be utilized in a well-known manner to image each material piece and determine the approximate dimensions of each material piece. Such camera(s) may be positioned in proximity to the conveyor belt before the sorting apparatus, or could be positioned downstream from the sorting apparatus so that only the sorted material pieces are imaged to determine their approximate masses.

If it can be assumed that a sufficient majority of the material pieces are all of about the same size and mass, then such implementations for determining the mass of each piece can be omitted.

Alternatively, the receptacle that is collecting the diverted material pieces could be positioned on a weight scale that continually weighs the collected material pieces, thus providing an approximate weight and resultant mass for each material piece as it is sorted and collected within the receptacle. These masses can them be utilized in the system and process 400 as described herein.

In accordance with certain embodiments of the present disclosure, a plurality of at least a portion of the system 100 may be linked together in succession in order to perform multiple iterations or layers of sorting. For example, when two or more systems 100 are linked in such a manner, the conveyor system may be implemented with a single conveyor belt, or multiple conveyor belts, conveying the material pieces past a first vision system (and, in accordance with certain embodiments, a sensor system) configured for sorting material pieces of a first set of a mixture of materials by a sorter (e.g., the first automation control system 108 and associated one or more sorting devices 126 . . . 129) into a first set of one or more receptacles (e.g., sorting receptacles 136 . . . 139), and then conveying the material pieces past a second vision system (and, in accordance with certain embodiments, another sensor system) configured for sorting material pieces of a second set of a mixture of materials by a second sorter into a second set of one or more sorting receptacles. A further discussion of such multistage sorting is in U.S. published patent application no. 2022/0016675, which is hereby incorporated by reference herein.

Such successions of systems 100 can contain any number of such systems linked together in such a manner. In accordance with certain embodiments of the present disclosure, each successive vision system or sensor system may be configured to sort out a different material than previous vision system(s) or sensor system(s) with the end result producing a collection of material pieces possessing the predetermined specific aggregate chemical composition.

With reference now to FIG. 11, a block diagram illustrating a data processing ("computer") system 3400 is depicted in which aspects of embodiments of the disclosure may be implemented. (The terms "computer," "system," "computer system," and "data processing system" may be used interchangeably herein.) The computer system 107, the automation control system 108, aspects of the sensor system(s) 120, and/or the vision system 110 may be configured similarly as the computer system 3400. The computer system 3400 may employ a local bus 3405. Any suitable bus architecture may be utilized such as a peripheral component interconnect ("PCI") local bus architecture, Accelerated Graphics Port ("AGP") architecture, or Industry Standard Architecture ("ISA"), among others. One or more processors 3415, volatile memory 3420, and non-volatile memory 3435 may be connected to the local bus 3405 (e.g., through a PCI Bridge (not shown)). An integrated memory controller and cache memory may be coupled to the one or more processors 3415. The one or more processors 3415 may include one or more central processor units and/or one or more graphics processor units 3401 and/or one or more tensor processing units. Additional connections to the local bus 3405 may be made through direct component interconnection or through add-in boards. In the depicted example, a communication (e.g., network (LAN)) adapter 3425, an I/O (e.g., small computer system interface ("SCSI") host bus) adapter 3430, and expansion bus interface (not shown) may be connected to the local bus 3405 by direct component connection. An audio adapter (not shown), a graphics adapter (not shown), and display adapter 3416 (coupled to a display 3440) may be connected to the local bus 3405 (e.g., by add-in boards inserted into expansion slots).

The user interface adapter 3412 may provide a connection for a keyboard 3413 and a mouse 3414, modem (not shown), and additional memory (not shown). The I/O adapter 3430 may provide a connection for a hard disk drive 3431, a solid state drive 3432, and a CD-ROM drive (not shown).

An operating system may be run on the one or more processors 3415 and used to coordinate and provide control of various components within the computer system 3400. In FIG. 11, the operating system may be a commercially available operating system. An object-oriented programming system (e.g., Java, Python, etc.) may run in conjunction with the operating system and provide calls to the operating system from programs or programs (e.g., Java, Python, etc.) executing on the system 3400. Instructions for the operating system, the object-oriented operating system, and programs may be located on non-volatile memory 3435 storage devices, such as a hard disk drive 3431 or solid state drive 3432, and may be loaded into volatile memory 3420 for execution by the processor 3415.

Those of ordinary skill in the art will appreciate that the hardware in FIG. 11 may vary depending on the implementation. Other internal hardware or peripheral devices, such as flash ROM (or equivalent nonvolatile memory) or optical disk drives and the like, may be used in addition to or in place of the hardware depicted in FIG. 11. Also, any of the processes of the present disclosure may be applied to a multiprocessor computer system, or performed by a plurality of such systems 3400. For example, training of the machine learning system may be performed by a first computer system 3400, while operation of the system 100 for sorting may be performed by a second computer system 3400.

As another example, the computer system 3400 may be a stand-alone system configured to be bootable without relying on some type of network communication interface, whether or not the computer system 3400 includes some type of network communication interface. As a further example, the computer system 3400 may be an embedded controller, which is configured with ROM and/or flash ROM providing non-volatile memory storing operating system files or user-generated data.

The depicted example in FIG. 11 and above-described examples are not meant to imply architectural limitations. Further, a computer program form of aspects of the present disclosure may reside on any computer readable storage medium (i.e., floppy disk, compact disk, hard disk, tape, ROM, RAM, etc.) used by a computer system.

As has been described herein, embodiments of the present disclosure may be implemented to perform the various functions described for identifying, tracking, classifying, and/or sorting material pieces. Such functionalities may be implemented within hardware and/or software, such as within one or more data processing systems (e.g., the data processing system 3400 of FIG. 11), such as the previously noted computer system 107, the vision system 110, aspects of the sensor system(s) 120, and/or the automation control system 108. Nevertheless, the functionalities described herein are not to be limited for implementation into any particular hardware/software platform.

As will be appreciated by one skilled in the art, aspects of the present disclosure may be embodied as a system, process, method, and/or computer program product. Accordingly, various aspects of the present disclosure may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a computer program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a solid state memory, a random access memory ("RAM") (e.g., RAM 3420 of FIG. 11), a read-only memory ("ROM") (e.g., ROM 3435 of FIG. 11), an erasable programmable read-only memory ("EPROM" or flash memory), an optical fiber, a portable compact disc read-only memory ("CD-ROM"), an optical storage device, a magnetic storage device (e.g., hard drive 3431 of FIG. 11), or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowchart and block diagrams in the figures illustrate architecture, functionality, and operation of possible implementations of systems, methods, processes, and computer program products according to various embodiments of the present disclosure. In this regard, each block in the flowcharts or block diagrams may represent a module, segment, or portion of code that includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

In the description herein, a flow-charted technique may be described in a series of sequential actions. The sequence of the actions, and the party performing the actions, may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

Modules implemented in software for execution by various types of processors (e.g., GPU 3401, CPU 3415) may, for instance, include one or more physical or logical blocks of computer instructions, which may, for instance, be organized as an object, procedure, or function. Nevertheless, the executables of an identified module need not be physically located together, but may include disparate instructions stored in different locations that when joined logically together, include the module and achieve the stated purpose for the module. Indeed, a module of executable code may be a single instruction, or many instructions, and may even be distributed over several different code segments, among different programs, and across several memory devices. Similarly, operational data (e.g., material classification libraries described herein) may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general purpose computer, special purpose computer, or other programmable data processing apparatus (e.g., controller) to produce a machine, such that the instructions, which execute via the processor(s) (e.g., GPU 3401, CPU 3415) of the computer or other programmable data processing apparatus, create circuitry or means for implementing the functions/acts specified in the flowchart and/or block diagram block or blocks. In a particular embodiment, computer program instructions may be configured to send sorting instructions to a sorting apparatus in order to direct sorting of certain ones of the material pieces from the plurality of material pieces to produce a collection of material pieces possessing a predetermined specific aggregate chemical composition.

It will also be noted that each block of the block diagrams and/or flowchart illustrations, and combinations of blocks in the block diagrams and/or flowchart illustrations, can be implemented by special purpose hardware-based systems (e.g., which may include one or more graphics processing units (e.g., GPU 3401)) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices, such as field programmable gate arrays, programmable array logic, programmable logic devices, or the like.

Computer program code, i.e., instructions, for carrying out operations for aspects of the present disclosure may be written in any combination of one or more programming languages, including an object oriented programming language such as Java, Smalltalk, Python, C++, or the like, conventional procedural programming languages, such as the "C" programming language or similar programming languages, or any of the machine learning software disclosed herein. The program code may execute entirely on the user's computer system, partly on the user's computer system, as a stand-alone software package, partly on the user's computer system (e.g., the computer system utilized for sorting) and partly on a remote computer system (e.g., the computer system utilized to train the sensor system), or entirely on the remote computer system or server. In the latter scenario, the remote computer system may be connected to the user's computer system through any type of network, including a local area network ("LAN") or a wide area network ("WAN"), or the connection may be made to an external computer system (for example, through the Internet using an Internet Service Provider).

These program instructions may also be stored in a computer readable storage medium that can direct a computer system, other programmable data processing apparatus, controller, or other devices to function in a particular manner, such that the instructions stored in the computer readable medium produce an article of manufacture including instructions which implement the function/act specified in the flowchart and/or block diagram block or blocks.

One or more databases may be included in a host for storing and providing access to data for the various implementations. One skilled in the art will also appreciate that, for security reasons, any databases, systems, or components of the present disclosure may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Association of certain data (e.g., between a classified material piece and its known chemical composition, or between a classified material piece and its calculated approximate mass) may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Aspects of the present disclosure provide a method that includes determining an approximate mass of each material piece of a plurality of material pieces, wherein at least one of the plurality of material pieces has a material classification different from the other material pieces; classifying each material piece of the plurality of material pieces as belonging to one of a plurality of different material classifications; and sorting certain ones of the material pieces from the plurality of material pieces as a function of the determined approximate mass and classification of each material piece of the plurality of material pieces, wherein the sorting produces a collection of material pieces possessing a predetermined specific aggregate chemical composition. The sorting may include diverting the certain ones of the material pieces into a receptacle. The sorting may include continually determining an aggregate chemical composition of the diverted material pieces. The sorting may include diverting a next material piece into the receptacle in order to increase a weight percentage of a specific chemical element of the aggregate chemical composition of the diverted material pieces. The sorting may include not diverting a next material piece into the receptacle in order to decrease a weight percentage of a specific chemical element of the aggregate chemical composition of the diverted material pieces. The sorting may include not diverting a next material piece into the receptacle because it contains a contaminant that is not desired within the predetermined specific aggregate chemical composition. The sorting may be continued until the aggregate chemical composition of a predetermined minimum number of diverted material pieces is equal to a threshold level of the predetermined specific aggregate chemical composition. The collection of material pieces possessing a predetermined specific aggregate chemical composition may contain at least one material piece that possesses a material classification different from the other material pieces in the collection. The plurality of material pieces may include material pieces possessing different metal alloy compositions. The predetermined specific aggregate chemical composition may be different than the chemical composition of each of the plurality of material pieces. The predetermined specific aggregate chemical composition may be different than the aggregate chemical composition of all of the plurality of material pieces. The collection of material pieces may include material pieces having different material classifications. The collection of material pieces may include at least one of the material pieces having a material classification different from the other material pieces. The plurality of pieces may include wrought aluminum alloy pieces and cast aluminum alloy pieces, wherein the collection of material pieces may include at least one wrought aluminum alloy piece and at least one cast aluminum alloy piece, and wherein the predetermined specific aggregate chemical composition is different than a chemical composition of the wrought aluminum alloy pieces, and wherein the predetermined specific aggregate chemical composition is different than a chemical composition of the cast aluminum alloy pieces. The classifying may include processing image data captured from each of the plurality of material pieces through a machine learning system.

Aspects of the present disclosure provide a system that includes a sensor configured to capture one or more characteristics of each of a mixture of material pieces, wherein the mixture of material pieces may include material pieces having different material classifications; a data processing system configured to classify each material piece of the mixture of material pieces as belonging to one of a plurality of different material classifications; and a sorting device configured to sort certain ones of the material pieces from the mixture of material pieces as a function of the classification of each material piece of the mixture of material pieces, wherein the sorting produces a collection of material pieces possessing a predetermined specific aggregate chemical composition. The sensor may be a camera, wherein the one or more captured characteristics were captured by the camera configured to capture images of each of the mixture of material pieces as they were conveyed past the camera, wherein the camera is configured to capture visual images of each of the mixture of materials to produce image data, and wherein the characteristics are visually observed characteristics. The data processing system may include a machine learning system implementing a neural network configured to classify each material piece of the mixture of material pieces as belonging to one of a plurality of different material classifications based on the captured visually observed characteristics. The system may further include an apparatus configured to determine an approximate mass of each material piece of a plurality of material pieces, wherein the sorting is performed as a function of the determined approximate mass and classification of each material piece. The apparatus may include a line scanner configured to measure an approximate size of each material piece.

Aspects of the present disclosure provide a computer program product stored on a computer readable storage medium, which when executed by a data processing system, performs a process that includes determining an approximate mass of each material piece of a plurality of material pieces, wherein at least one of the plurality of material pieces has a material classification different from the other material pieces; classifying each material piece of the plurality of material pieces as belonging to one of a plurality of different material classifications; and directing sorting of certain ones of the material pieces from the plurality of material pieces to produce a collection of material pieces possessing a predetermined specific aggregate chemical composition, wherein the sorting is performed as a function of the determined approximate mass and classification of each material piece of the plurality of material pieces, wherein the collection of material pieces includes material pieces having different material classifications. The classifying may include processing image data captured from each of the plurality of material pieces through a machine learning system. The predetermined specific aggregate chemical composition may be different than the chemical composition of each of the plurality of material pieces.

Reference is made herein to "configuring" a device or a device "configured to" perform some function. It should be understood that this may include selecting predefined logic blocks and logically associating them, such that they provide particular logic functions, which includes monitoring or control functions. It may also include programming computer software-based logic of a control device, wiring discrete hardware components, or a combination of any or all of the foregoing.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations may be not shown or described in detail to avoid obscuring aspects of the disclosure.

Those of skill in the art should appreciate that the various settings and parameters (including the neural network parameters) of the components of the system 100 may be customized, optimized, and reconfigured over time based on the types of materials being classified and sorted, the desired classification and sorting results, the type of equipment being used, empirical results from previous classifications, data that becomes available, and other factors.

Reference throughout this specification to "an embodiment," "embodiments," or similar language means that a particular feature, structure, or characteristic described in connection with the embodiments is included in at least one embodiment of the present disclosure. Thus, appearances of the phrases "in one embodiment," "in an embodiment," "embodiments," "certain embodiments," "various embodiments," and similar language throughout this specification may, but do not necessarily, all refer to the same embodiment. Furthermore, the described features, structures, aspects, and/or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

Benefits, advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims. Further, no component described herein is required for the practice of the disclosure unless expressly described as essential or critical.

While this specification contains many specifics, these should not be construed as limitations on the scope of the disclosure or of what can be claimed, but rather as descriptions of features specific to particular implementations of the disclosure. Headings herein may be not intended to limit the disclosure, embodiments of the disclosure or other matter disclosed under the headings.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The terminology used herein is for the purpose of describing particular embodiments only and is not intended to be limiting of the disclosure. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

As used herein, terms such as "controller," "processor," "memory," "neural network," "interface," "sorter," "sorter apparatus," "sorting device," "device," "pushing mechanism," "pusher devices," "imaging sensor," "bin," "receptacle," "system," and "circuitry" each refer to non-generic device elements that would be recognized and understood by those of skill in the art and are not used herein as nonce words or nonce terms for the purpose of invoking 35 U.S.C. 112(f).

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, exemplary fractions, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Unless defined otherwise, all technical and scientific terms (such as acronyms used for chemical elements within the periodic table) used herein have the same meaning as commonly understood to one of ordinary skill in the art to which the presently disclosed subject matter belongs. All publications, patent applications, patents, and other references mentioned herein are incorporated by reference in their entirety, unless a particular passage is cited. In case of conflict, the present specification, including definitions, will control. In addition, the materials, methods, and examples are illustrative only, and not intended to be limiting.

To the extent not described herein, many details regarding specific materials, processing acts, and circuits are conventional, and may be found in textbooks and other sources within the computing, electronics, and software arts.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter. As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method. As used herein, the term "similar" may refer to values that are within a particular offset or percentage of each other (e.g., 1%, 2%, 5%, 10%, etc.).

What is claimed is:

1. A system comprising:

a camera configured to capture one or more visually observed characteristics of each of a mixture of material pieces, wherein the mixture of material pieces comprises material pieces having different material classifications, wherein the one or more captured visually observed characteristics were captured by the camera configured to capture visual images of each of the mixture of material pieces as they were conveyed past the camera;

a data processing system comprising a machine learning system implementing a neural network configured to classify each material piece of the mixture of material pieces as belonging to one of a plurality of different material classifications based on the captured visually observed characteristics, wherein the data processing system comprises:

circuitry configured to determine a chemical composition of each material piece based on the determined classification; and circuitry configured to continually determine an aggregate chemical composition of all of the sorted material pieces; and a sorting device configured to sort certain ones of the material pieces from the mixture of material pieces as a function of the classification of each material piece of the mixture of material pieces, wherein the sorting produces a collection of material pieces possessing a predetermined specific aggregate chemical composition, wherein the data processing system comprises:

circuitry configured to instruct the sorting device to sort a next material piece in order to increase a weight percentage of a specific chemical element of the aggregate chemical composition of the sorted material pieces; and circuitry configured to instruct the sorting device to sort a next material piece in order to decrease a weight percentage of a specific chemical element of the aggregate chemical composition of the sorted material pieces.

2. The system as recited in claim 1, wherein the data processing system comprises circuitry configured to instruct the sorting device to continue sorting of material pieces until the aggregate chemical composition of a predetermined minimum number of sorted material pieces is equal to a threshold level of the predetermined specific aggregate chemical composition.

3. The system as recited in claim 1, wherein the plurality of material pieces includes material pieces possessing different metal alloy compositions.

4. The system as recited in claim 1, wherein the predetermined specific aggregate chemical composition is different than the chemical composition of each of the plurality of material pieces.

5. The system as recited in claim 1, wherein the collection of material pieces includes material pieces having different material classifications.

6. The system as recited in claim 1, wherein the plurality of pieces comprises aluminum alloy pieces of different alloy compositions, and wherein the collection of material pieces comprises at least one aluminum alloy piece having a chemical composition different than the other material pieces within the collection, and wherein the predetermined specific aggregate chemical composition is different than a chemical composition of the aluminum alloy pieces.

7. A system comprising:

a sensor configured to capture one or more characteristics of each of a mixture of material pieces, wherein the mixture of material pieces comprises material pieces having different material classifications;

an apparatus configured to determine an approximate mass of each material piece of the mixture of material pieces;

a data processing system configured to classify each material piece of the mixture of material pieces as belonging to one of a plurality of different material classifications; and a sorting device configured to sort certain ones of the material pieces from the mixture of material pieces as a function of the determined approximate mass and classification of each material piece of the mixture of material pieces, wherein the sorting produces a collection of material pieces possessing a predetermined specific aggregate chemical composition, wherein the sensor comprises an x-ray fluorescence ("XRF) system and classification is based on captured XRF spectra from each material piece.

8. The system as recited in claim 7, wherein the apparatus comprises a line scanner configured to measure an approximate size of each material piece.

9. A computer program product stored on a computer readable storage medium, which when executed by a data processing system, performs a process comprising:

determining a mass of each material piece of a plurality of material pieces, wherein at least one of the plurality of material pieces has a material classification different from the other material pieces;

classifying each material piece of the plurality of material pieces as belonging to one of a plurality of different material classifications; and directing selecting and sorting of certain ones of the material pieces from the plurality of material pieces to produce a collection of material pieces possessing a predetermined specific aggregate chemical composition, wherein the sorting is performed as a function of the determined mass and classification of each material piece of the plurality of material pieces, wherein the collection of material pieces comprises material pieces having different material classifications, wherein the directing selecting and sorting comprises:

directing sorting of a next material piece in order to increase a weight percentage of a specific chemical element of an aggregate chemical composition of the collection of material pieces; and directing sorting of a next material piece in order to decrease a weight percentage of a specific chemical element of the aggregate chemical composition of the collection of material pieces.

10. The computer program product as recited in claim 9, wherein the classifying comprises processing image data captured from each of the plurality of material pieces through a machine learning system.

11. The computer program product as recited in claim 9, wherein the predetermined specific aggregate chemical composition is different than the chemical composition of each of the plurality of material pieces.

12. The computer program product as recited in claim 9, wherein the directing selecting comprises continually determining an aggregate chemical composition of the sorted material pieces.

13. The computer program product as recited in claim 9, wherein the directing selecting and sorting is continued until the aggregate chemical composition of a predetermined minimum number of diverted material pieces is equal to a threshold level of the predetermined specific aggregate chemical composition.

14. The computer program product as recited in claim 9, wherein the plurality of material pieces includes material pieces possessing different metal alloy compositions.

15. The computer program product as recited in claim 9, wherein the predetermined specific aggregate chemical composition is different than the chemical composition of each of the plurality of material pieces.

16. The computer program product as recited in claim 9, wherein the directing selecting comprises determining a chemical composition of each material piece based on the determined classification.

17. The computer program product as recited in claim 9, wherein the collection of material pieces includes the at least one of the material pieces having a material classification different from the other material pieces.

18. A system comprising:

a sensor configured to capture one or more characteristics of each of a mixture of material pieces, wherein the mixture of material pieces comprises material pieces having different material classifications;

an apparatus configured to determine an approximate mass of each material piece of the mixture of material pieces, wherein the apparatus comprises a line scanner configured to measure an approximate size of each material piece;

a data processing system configured to classify each material piece of the mixture of material pieces as belonging to one of a plurality of different material classifications; and a sorting device configured to sort certain ones of the material pieces from the mixture of material pieces as a function of the determined approximate mass and classification of each material piece of the mixture of material pieces, wherein the sorting produces a collection of material pieces possessing a predetermined specific aggregate chemical composition.

* * * * *